(12) United States Patent
Yamane et al.

(10) Patent No.: US 8,934,699 B2
(45) Date of Patent: Jan. 13, 2015

(54) INFORMATION PROCESSING APPARATUS, INFORMATION PROCESSING METHOD, PROGRAM, AND RECORDING MEDIUM

(75) Inventors: Kenji Yamane, Kanagawa (JP); Masahiro Takahashi, Kanagawa (JP); Shinji Watanabe, Tokyo (JP); Yoichi Mizutani, Saitama (JP); Yutaka Hasegawa, Kanagawa (JP); Hiroshi Kyusojin, Tokyo (JP)

(73) Assignee: Sony Corporation, Tokyo (JP)

( * ) Notice: Subject to any disclaimer, the term of this patent is extended or adjusted under 35 U.S.C. 154(b) by 193 days.

(21) Appl. No.: 13/610,442

(22) Filed: Sep. 11, 2012

(65) Prior Publication Data

US 2013/0070970 A1 Mar. 21, 2013

(30) Foreign Application Priority Data

Sep. 21, 2011 (JP) ................ 2011-205864

(51) Int. Cl.
*G06K 9/00* (2006.01)
*G02B 21/36* (2006.01)
*G06T 7/00* (2006.01)
*G02B 21/00* (2006.01)

(52) U.S. Cl.
CPC ............ *G02B 21/367* (2013.01); *G06T 7/0012* (2013.01); *G02B 21/0004* (2013.01)
USPC ............................................. 382/133

(58) Field of Classification Search
CPC ............ G02B 21/0004; G02B 21/002; G02B 21/0036; G02B 21/36; G02B 21/365; G02B 21/367; G06T 7/0012; G06T 2207/10056; G06T 2207/30024; G06K 9/00127; G06K 9/00134; G06K 9/0014
USPC ............ 382/128, 133, 134, 318, 319; 348/79
See application file for complete search history.

(56) References Cited

U.S. PATENT DOCUMENTS

2010/0177189 A1* 7/2010 Rughani et al. .............. 348/79
2010/0231703 A1* 9/2010 Varga et al. ................. 348/79

FOREIGN PATENT DOCUMENTS

JP 2009-037250 A 2/2009 ............ G02B 21/36

* cited by examiner

*Primary Examiner* — Andrew W Johns
(74) *Attorney, Agent, or Firm* — K&L Gates LLP

(57) ABSTRACT

An information processing apparatus includes a memory and a control unit. The memory stores a first image. The control unit divides the first image into a plurality of regions. Further, the control unit calculates a likelihood of an existence of a sample in the plurality of regions thus divided for each of the plurality of regions. Further, the control unit generates an existence map based on the calculated likelihood, the existence map having the plurality of regions classified into first regions, second regions, and third regions. Further, the control unit generates imaging sequence information based on the generated existence map, the imaging sequence information indicating imaging sequences such that the first regions are imaged prior to the second regions and a total movement distance of a stage for imaging the first and second regions becomes minimum.

2 Claims, 22 Drawing Sheets

FIG.12A   FIG.12B
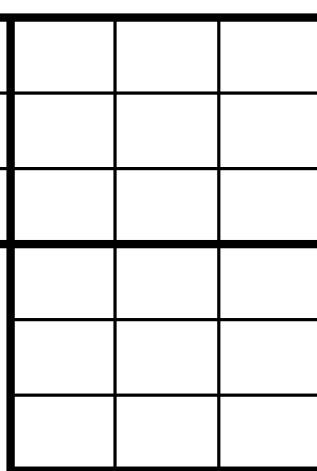
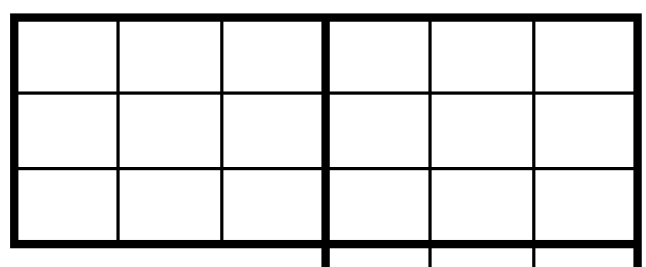
FIG.12C
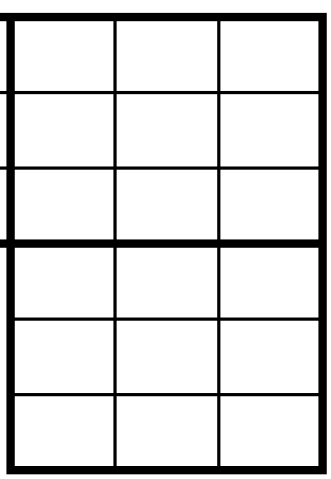
FIG.13
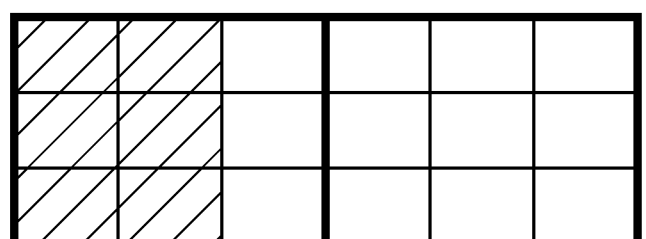

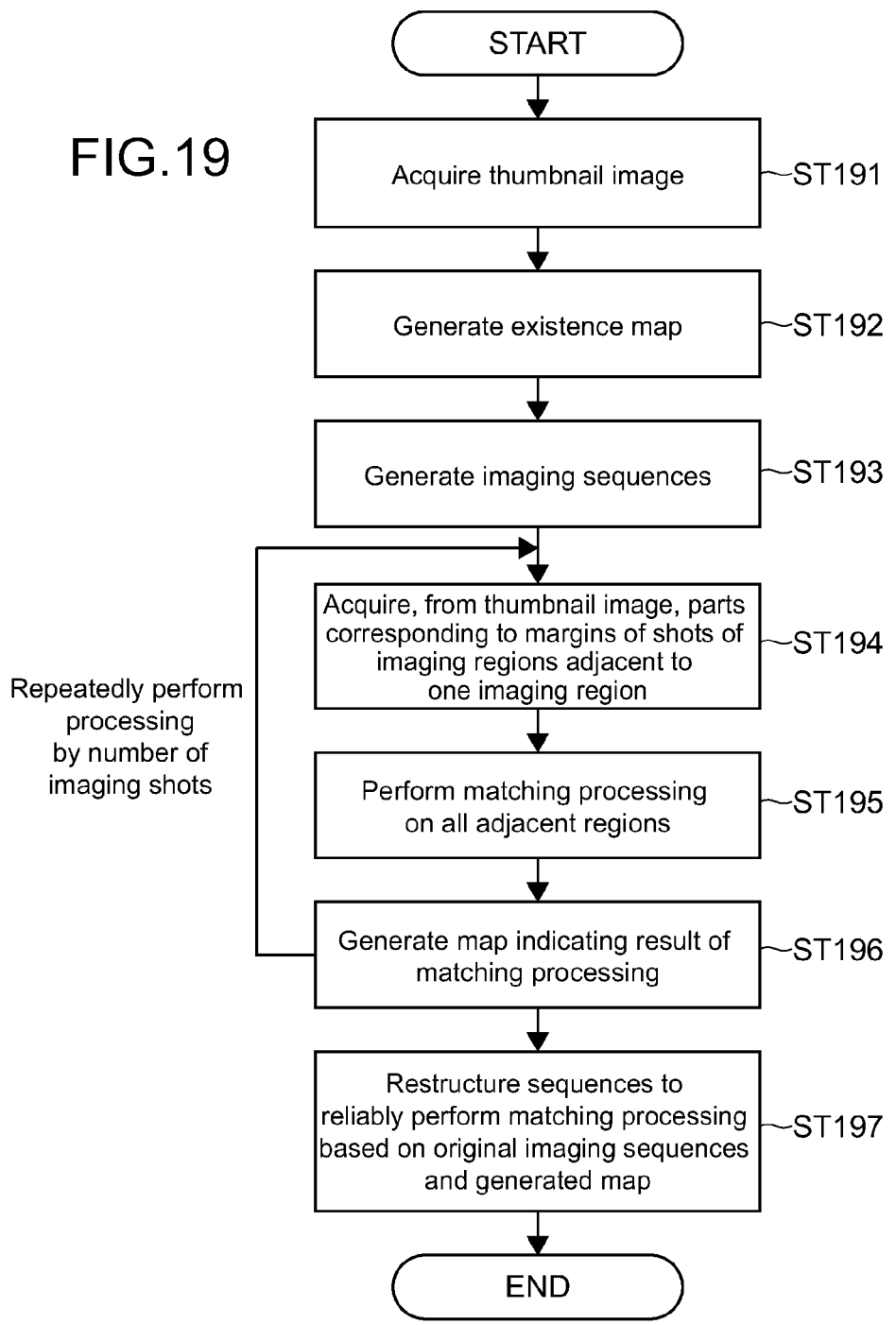

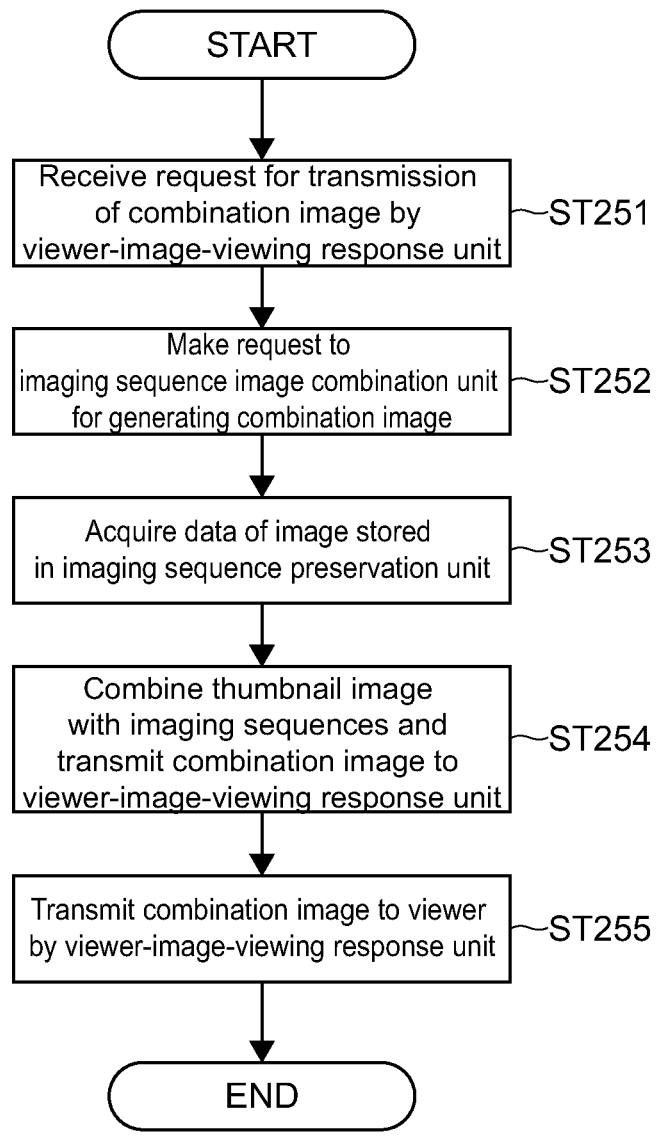

FIG. 26C
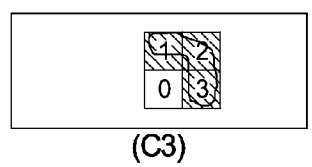
(C1) When imaging is completed in first imaging sequence
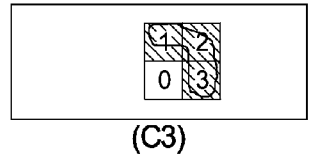
(C2) When imaging is completed in second imaging sequence
(C3) When imaging is completed in third imaging sequence

INFORMATION PROCESSING APPARATUS, INFORMATION PROCESSING METHOD, PROGRAM, AND RECORDING MEDIUM

BACKGROUND

The present disclosure relates to an information processing apparatus that processes image information obtained by a microscope in the field of medical treatment, pathology, biology, material, or the like. Also, the present disclosure relates to an information processing method, a program, and a recording medium used therefor.

In the field of medical treatment, pathology, or the like, there has been proposed a system where an image of an observation target such as a cell, a tissue, and an organ of a living body, obtained by an optical microscope, is digitized and a user (such as a doctor and a pathologist) examines the tissue or the like and diagnoses a patient based on the digital image. Such a system is generally called a virtual microscope.

For example, according to a method described in Japanese Patent Application Laid-open No. 2009-37250, an image optically obtained from a pathological sample slide placed on the stage of a microscope is digitized by a video camera with CCDs (Charge Coupled Devices), and the digital signal is input to a PC (Personal Computer) and made visible on a monitor. A pathologist sees an image displayed on the monitor and performs a diagnosis or the like.

SUMMARY

The pathological sample slide is generally imaged for every region in a predetermined range of the slide, while the stage of the microscope is moved. Then, images captured for the regions are joined together (subjected to matching processing), viewed by a doctor or the like on an image display system (viewer), and used for a pathological diagnosis or the like.

Accordingly, in order to perform a quick pathological diagnosis, it is important to quickly capture the images of the respective regions on the slide and join the captured images together. To this end, it may be necessary to identify the regions where a sample absolutely exists in the slide and determine the movement direction of the stage to efficiently image the regions, i.e., the order of imaging the regions.

The present disclosure has been made in view of the above circumstances, and it is therefore desirable to provide an information processing apparatus capable of quickly performing the imaging processing of a sample and efficiently performing matching processing. Also, it is desirable to provide an information processing method, a program, and a recording medium used therefor.

According to an embodiment of the present disclosure, there is provided an information processing apparatus including a memory and a control unit. The memory is capable of storing a first image where a whole sample mounted on a stage is imaged by an imaging apparatus at a first resolution. The control unit is capable of dividing the first image into a plurality of regions and calculating a likelihood of an existence of the sample in the plurality of regions thus divided for each of the plurality of regions. In addition, the control unit is capable of generating an existence map based on the calculated likelihood, the existence map having the plurality of regions classified into first regions where the sample exists at a first likelihood, second regions where the sample exists at a second likelihood lower than the first likelihood, and third regions where the sample does not exist. Moreover, the control unit is capable of generating imaging sequence information based on the generated existence map, the imaging sequence information indicating imaging sequences such that the first regions are imaged prior to the second regions and a total movement distance of the stage for imaging the first regions and the second regions becomes minimum when a plurality of second images of the first regions and the second regions are captured by the imaging apparatus at a second resolution higher than the first resolution.

With this configuration, the information processing apparatus allows the imaging apparatus to quickly perform the imaging processing of the sample and is capable of performing the subsequent matching processing of the second images.

The control unit may generate the imaging sequence information such that the plurality of first regions successively arranged in the same direction are preferentially imaged.

Accordingly, because the information processing apparatus minimizes the movement amount of the stage, the subsequent imaging processing can be quickly performed.

The control unit may update the imaging sequence information such that two of the second images are not successively captured when the sample is determined not to exist in each of adjacent parts of the two second images sequenced to be successively captured according to the imaging sequence information.

Accordingly, the information processing apparatus can prevent a positional shift from occurring in other second images when the two images actually having no parts for performing matching processing are joined together, and thus increase the precision of the matching processing.

The control unit may update the existence map such that the first regions serving as imaging sources of the two second images are classified as the second regions or the second regions serving as imaging sources of the two second images are classified as the third regions, and update the imaging sequence information based on the updated existence map.

Accordingly, the information processing apparatus updates the existence map such that the likelihood of the existence of the sample becomes low in the regions serving as the imaging sources of the two second images having no parts for performing the matching processing. As a result, the information processing apparatus can update the imaging sequences and increase the precision of the matching processing.

The control unit may update the existence map by reclassifying one of the second regions and the third regions surrounded by the first regions as the first regions in the generated existence map, and generate the imaging sequence information based on the updated existence map.

Accordingly, the information processing apparatus can prevent complicated imaging sequences and reduction in imaging speed and imaging precision caused when the second regions or the third regions surrounded by the first regions exist.

The information processing apparatus may further include a communication unit capable of communicating with a server on a network. In this case, the control unit may control the communication unit such that the imaging sequence information and information on one of the imaged first regions and second regions are transmitted to the server.

Accordingly, the information processing apparatus can notify the server of what sequences the regions of the sample are imaged and what extent the imaging of the regions has been completed.

The control unit may control the memory such that the plurality of captured second images are stored to be matched together. In addition, the control unit may control the communication unit such that a region of the stored second image not used for performing matching processing with the adjacent second image sequenced to be captured in a second place is encoded based on the existence map and the imaging sequence information, and data of the encoded region is transmitted to the server. Moreover, the control unit may control the communication unit such that, upon completion of the matching processing, a region of the second image used for performing the matching processing is encoded together with a region of the adjacent second image not used for performing matching processing with the adjacent second image sequenced to be captured in a third place, and data of the region encoded together with the region not used for performing the matching processing is transmitted to the server.

Accordingly, the information processing apparatus can appropriately upload the data of the regions that have been imaged and encoded to the server based on the existence map and the imaging sequences.

The control unit may secure, prior to the matching processing, the memory only for the region used for performing the matching processing among the regions of the plurality of second images based on the existence map and the imaging sequence information.

Accordingly, the information processing apparatus can prevent the useless securement of the memory for the regions not used for performing the matching processing.

The control unit may control the communication unit such that notification information notifying completion of the imaging is transmitted to the server every time the region is encoded.

Accordingly, with the reception of the notification information, the server allows a user of a viewer connected to the server to appropriately view the data of the regions that have been imaged.

According to another embodiment of the present disclosure, there is provided an information processing method including: storing a first image where a whole sample mounted on a stage is imaged by an imaging apparatus at a first resolution; dividing the first image into a plurality of regions; calculating a likelihood of an existence of the sample in the plurality of regions thus divided for each of the plurality of regions; generating an existence map based on the calculated likelihood, the existence map having the plurality of regions classified into first regions where the sample exists at a first likelihood, second regions where the sample exists at a second likelihood lower than the first likelihood, and third regions where the sample does not exist; and generating imaging sequence information based on the generated existence map, the imaging sequence information indicating imaging sequences such that the first regions are imaged prior to the second regions and a total movement distance of the stage for imaging the first regions and the second regions becomes minimum when a plurality of second images of the first regions and the second regions are captured by the imaging apparatus at a second resolution higher than the first resolution.

According to still another embodiment of the present disclosure, there is provided a program for causing an information processing apparatus to perform: storing a first image where a whole sample mounted on a stage is imaged by an imaging apparatus at a first resolution; dividing the first image into a plurality of regions; calculating a likelihood of an existence of the sample in the plurality of regions thus divided for each of the plurality of regions; generating an existence map based on the calculated likelihood, the existence map having the plurality of regions classified into first regions where the sample exists at a first likelihood, second regions where the sample exists at a second likelihood lower than the first likelihood, and third regions where the sample does not exist; and generating imaging sequence information based on the generated existence map, the imaging sequence information indicating imaging sequences such that the first regions are imaged prior to the second regions and a total movement distance of the stage for imaging the first regions and the second regions becomes minimum when a plurality of second images of the first regions and the second regions are captured by the imaging apparatus at a second resolution higher than the first resolution.

According to yet another embodiment of the present disclosure, there is provided a recording medium having recorded thereon a plurality of second images captured by an imaging apparatus based on imaging sequence information by: storing a first image where a whole sample mounted on a stage is imaged by the imaging apparatus at a first resolution; dividing the first image into a plurality of regions; calculating a likelihood of an existence of the sample in the plurality of regions thus divided for each of the plurality of regions; generating an existence map based on the calculated likelihood, the existence map having the plurality of regions classified into first regions where the sample exists at a first likelihood, second regions where the sample exists at a second likelihood lower than the first likelihood, and third regions where the sample does not exist; and generating imaging sequence information based on the generated existence map, the imaging sequence information indicating imaging sequences such that the first regions are imaged prior to the second regions and a total movement distance of the stage for imaging the first regions and the second regions becomes minimum when the plurality of second images of the first regions and the second regions are captured by the imaging apparatus at a second resolution higher than the first resolution.

As described above, according to the embodiments of the present disclosure, it is possible to quickly perform the imaging processing of a sample and efficiently perform matching processing.

Additional features and advantages are described herein, and will be apparent from the following Detailed Description and the figures.

BRIEF DESCRIPTION OF FIGURES

FIGS. 7A and 7B are diagrams showing the general outline of the generation processing of imaging sequence information by the control PC;

FIGS. 12A to 12C are diagrams showing an example of the one imaging sequence processing and compression processing;

FIG. 13 is a diagram showing the example of the one imaging sequence processing and compression processing;

FIG. 19 is a flowchart showing the flow of the change processing of imaging sequences according to the method shown in 18A;

FIG. 25 is a flowchart showing the flow of the generation processing of an imaging sequence combination image by the server; and FIGS. 26A to 26C are diagrams for explaining the general outline of the generation processing of the imaging sequence combination image by the server.

DETAILED DESCRIPTION

Hereinafter, an embodiment of the present disclosure will be described with reference to the drawings.

(General Outline of System)

Figure 1:
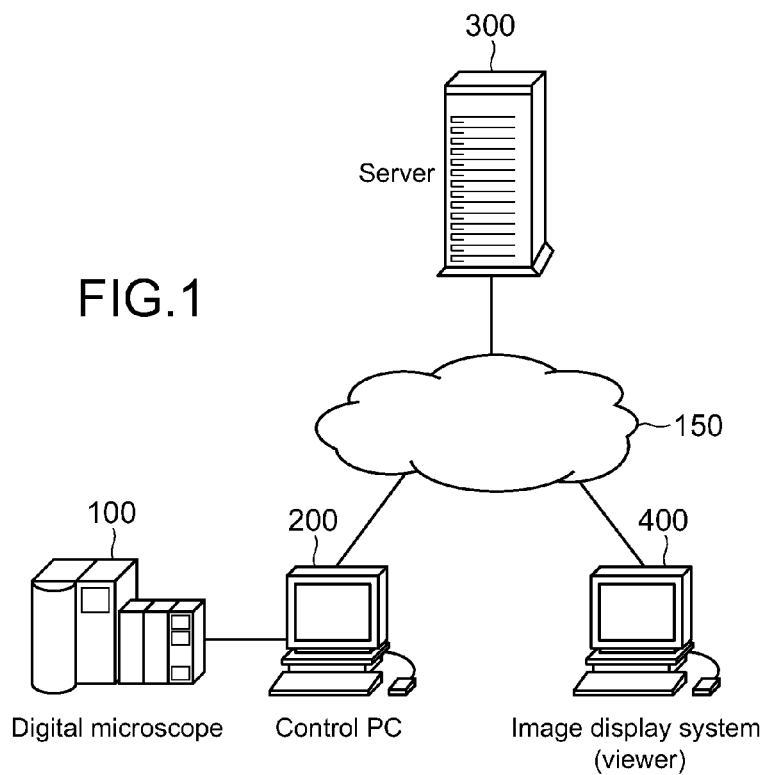
FIG. 1 is a diagram showing the general outline of a virtual microscope system according to an embodiment of the present disclosure.

FIG. 1 is a diagram showing the general outline of a virtual microscope system according to the embodiment of the present disclosure.

As shown in FIG. 1, the system includes a digital microscope 100, a control PC 200, a server 300, and an image display system (viewer) 400. These apparatuses are capable of communicating with each other via a network 150 such as the Internet and a LAN (Local Area Network).

The digital microscope 100 images, while moving a stage, a pathological sample slide for each of a plurality of regions. The pathological sample slide is a glass slide that contains, as a sample, a section of a tissue of a living body or the like.

The control PC 200 controls the imaging processing of the pathological sample slide (hereinafter simply referred to as a pathological slide) including the movement processing of the stage (determination processing of imaging sequences) by the digital microscope 100. In addition, the control PC 200 performs image processing such as matching processing and compression processing on a plurality of captured images of the pathological slide (hereinafter simply referred to as slide images), and uploads the processed images to the server 300.

The server 300 manages the slide images uploaded from the control PC 200 and transmits, upon request, the slide images to the viewer 400 to be displayed thereon. In addition, the server 300 generates a GUI (Graphical User Interface) for a user of the viewer 400 with respect to the slide images capable of being viewed on the viewer 400.

The viewer 400 displays the slide images received from the server 300. The user of the viewer 400 (person who views the slide images) is, for example, a doctor or the like and performs a pathological diagnosis based on the displayed slide images.

(Hardware Configuration of Digital Microscope)

Figure 2:
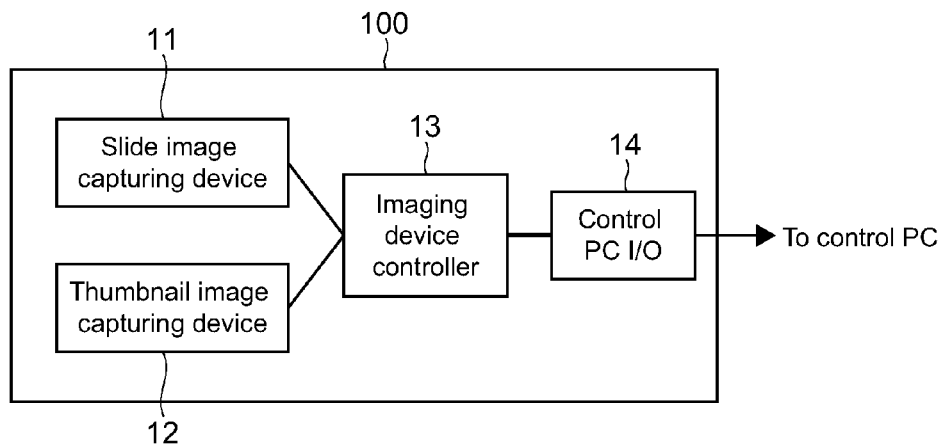
FIG. 2 is a diagram showing the hardware configuration of the digital microscope shown in FIG. 1.

FIG. 2 is a diagram showing the hardware configuration of the digital microscope 100.

As shown in FIG. 2, the digital microscope 100 includes a slide image capturing device 11, a thumbnail image capturing device 12, an imaging device controller 13, and a control PC input/output unit (I/O) 14.

The slide image capturing device 11 includes the stage having the pathological slide placed thereon and capable of moving in, for example, X, Y, and Z directions, an optical system, a digital camera, and the like. The slide image capturing device 11 enlarges and captures the images of a plurality of regions of the pathological slide in such a manner as to separately capture the images while moving the stage.

The thumbnail image capturing device 12 captures the whole image of the pathological slide and includes an optical system, a digital camera, and the like having lower magnification than the slide image capturing device 11. That is, the thumbnail image capturing device 12 captures the image (thumbnail image) having lower resolution than the slide images captured by the slide image capturing device 11.

As will be described in detail below, the thumbnail image is used for discriminating the regions where a sample actually exists in the whole region on the pathological slide, i.e., the regions to be actually imaged (enlarged and imaged) by the slide image capturing device 11. In the following description, when the images are simply referred to as the "slide images," they represent the images obtained by enlarging and imaging part of the pathological slide and are different from the "thumbnail image."

The imaging device controller 13 controls the imaging processing by the slide image capturing device 11 and the imaging processing by the thumbnail image capturing device 12.

The control PC input/output unit 14 is a communication interface for connection with the control PC 200. The control PC input/output unit 14 receives a control command from the control PC 200 and transmits the captured images to the control PC 200.

(Hardware Configuration of Control PC)

Figure 3:
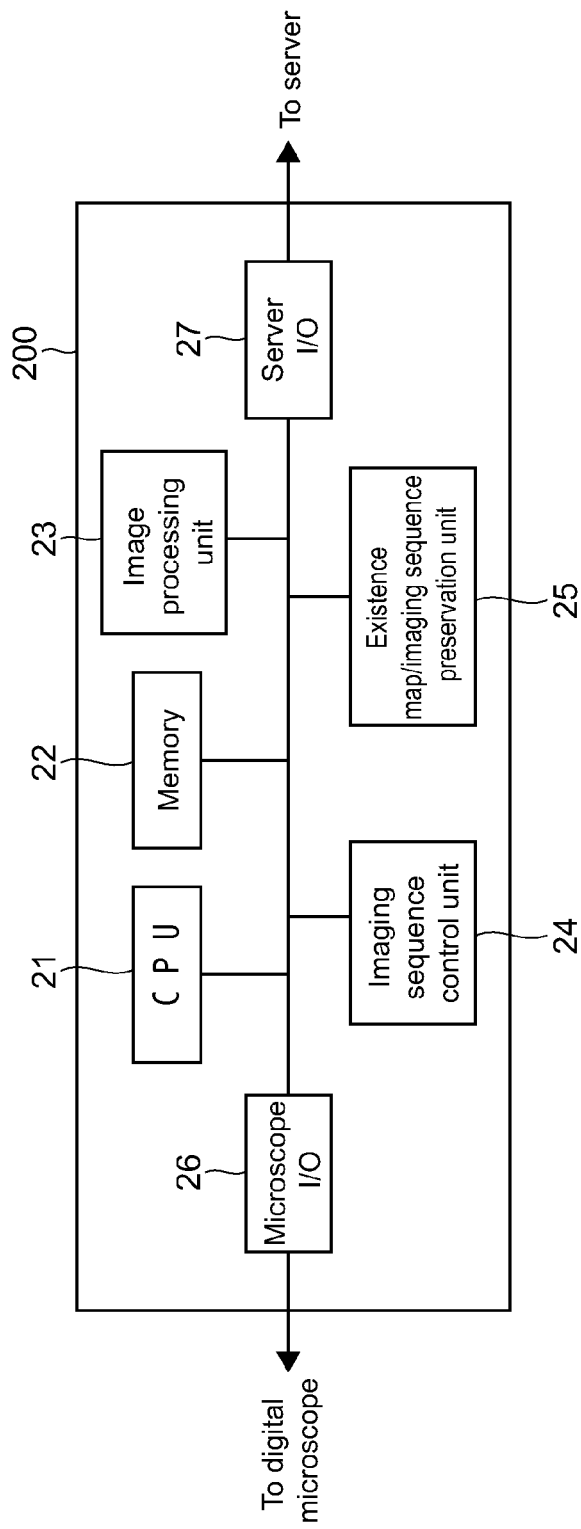
FIG. 3 is a diagram showing the hardware configuration of a control PC shown in FIG. 1.

FIG. 3 is a diagram showing the hardware configuration of the control PC 200.

As shown in FIG. 3, the control PC 200 includes a CPU (Central Processing Unit) 21, a memory 22, an image processing unit 23, an imaging sequence control unit 24, an existence map/imaging sequence preservation unit 25, a microscope input/output unit (I/O) 26, and a server input/output unit (I/O) 27.

The CPU 21 collectively controls the respective units of the control PC 200. The CPU 21 performs, for example, the generation processing of an existence map, the generation processing of imaging sequence information, matching processing, which will be described below, or the like.

The memory 22 is used as a work area of the CPU 21 and temporarily stores the slide images, the thumbnail image, or the like imaged by the digital microscope 100 and input from the microscope input/output unit 26.

The image processing unit 23 performs image processing on the thumbnail image and the slide images necessary for the generation processing of an existence map, the generation processing of imaging sequence information, the matching processing, or the like. Further, the image processing unit 23 includes a matching engine particularly for the matching processing.

The imaging sequence control unit 24 performs the generation processing of imaging sequence information in cooperation with the CPU 21 and controls the imaging processing (the order of imaging) of the respective regions of the pathological slide by the digital microscope 100 based on the imaging sequence information. Moreover, the imaging sequence control unit 24 compresses the captured slide images in units of tiles and uploads the compressed slide images to the server 300.

The existence map/imaging sequence preservation unit 25 preserves and manages a generated existence map and imaging sequence information.

The microscope input/output unit 26 is a communication interface for connection with the digital microscope 100. The microscope input/output unit 26 transmits a control command to the digital microscope 100 and receives the slide images captured by the digital microscope 100.

The server input/output unit 27 is a communication interface for connection with the server 300. The server input/output unit 27 receives a request from the server 300 and transmits the thumbnail image, the slide images, the imaging sequence information, or the like to the server 300.

The image processing unit 23 and the imaging sequence control unit 24 may be configured as software.

Besides the units shown in FIG. 3, the control PC 200 includes a storage unit (such as an HDD and a flash memory) that stores various data, an OS (Operating System), and other programs (software).

(Hardware Configuration of Server)

Figure 4:
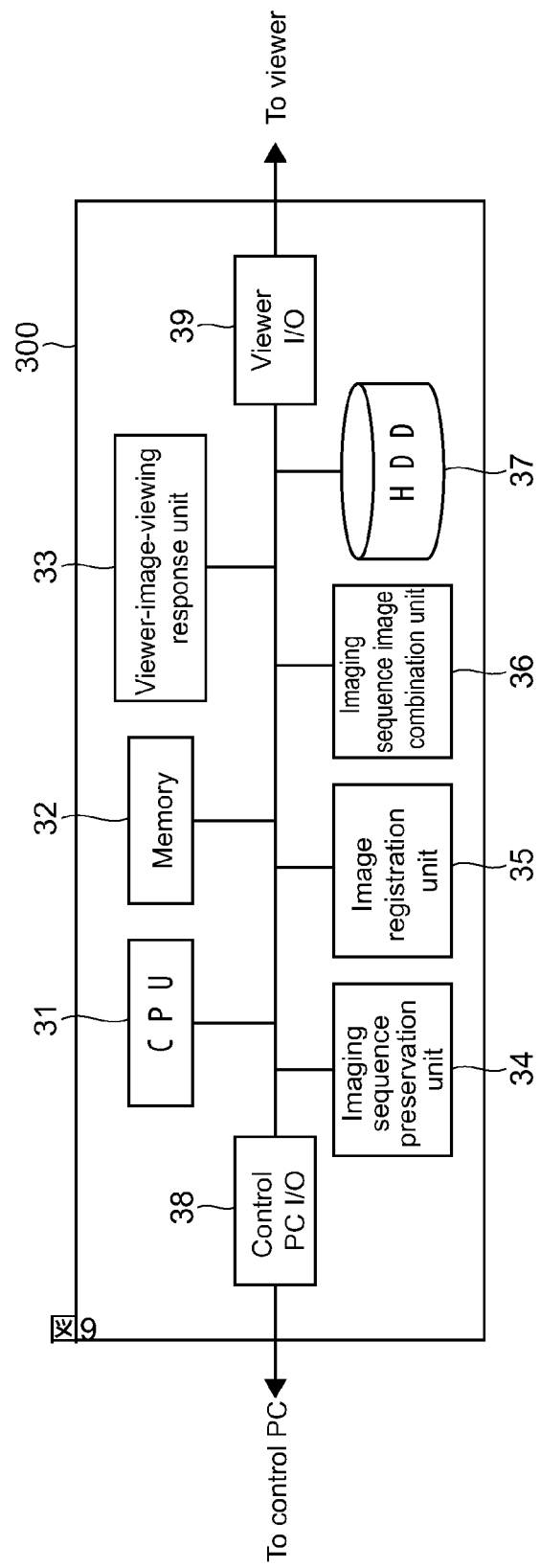
FIG. 4 is a diagram showing the hardware configuration of a server shown in FIG. 1.

FIG. 4 is a diagram showing the hardware configuration of the server 300.

As shown in FIG. 4, the server 300 includes a CPU 31, a memory 32, a viewer-image-viewing response unit 33, an imaging sequence preservation unit 34, an image registration unit 35, an imaging sequence image combination unit 36, an HDD (Hard Disk Drive) 37, a control PC input/output unit (I/O) 38, and a viewer input/output unit (I/O) 39.

The CPU 31 collectively controls the respective units of the server 300. The CPU 31 performs, for example, imaging sequence image combination processing that will be described below.

The memory 32 is used as a work area of the CPU 31 and temporarily stores data such as the imaging sequence information and the slide images at the imaging sequence image combination processing, the transmission processing of the slide images to the viewer 400, or the like.

The viewer-image-viewing response unit 33 performs the response processing of the slide images to be viewed, in response to a request from the viewer 400 for viewing an imaging sequence combination image (that will be described below) and slide images.

The imaging sequence preservation unit 34 preserves the imaging sequence information received from the control PC 200.

The image registration unit 35 registers the slide images received from the control PC 200 as images capable of being accessed from the viewer 400 together with their IDs.

The imaging sequence image combination unit 36 combines the thumbnail image received from the control PC 200 with the imaging sequence information, in response to a request from the viewer-image-viewing response unit 33. Hereinafter, the image thus combined will be referred to as an "imaging sequence combination image. As will be described in detail below, the imaging sequence combination image is an image where the path of imaging sequences is indicated on the thumbnail image. The imaging sequence combination image is used to allow the user of the viewer 400 to visually confirm which positions of the images of the pathological slide and what sequences the images of the positions of the pathological slide are to be displayed.

The HDD 37 stores the registered slide images together with their IDs as a database. Actually, the slide images are stored in units of tiles described above and managed according to the IDs of the respective tiles. In addition, the HDD 37 stores data used for the processing by the CPU 31, an OS capable of being performed by the CPU 31, and other programs. Instead of the HDD 37, a recording medium such as a flash memory may be used. The recording medium may be a portable type.

The control PC input/output unit 38 is a communication interface for connection with the control PC 200. The control PC input/output unit 38 receives data such as the thumbnail image, the slide images, and the imaging sequence information from the control PC 200 and transmits various requests to the control PC 200.

The viewer input/output unit (I/O) 39 is a communication interface for connection with the viewer 400. The viewer input/output unit 39 receives requests for the transmission of the slide images and the imaging sequence combination image from the viewer 400 and transmits the slide images and the imaging sequence combination image to the viewer 400 in response to the requests.

Although the description of the hardware configuration of the viewer 400 is omitted, the viewer 400 includes, besides a display, various hardware such as a CPU, a RAM, and a communication unit so as to serve as a general computer.

(Operations of System)

Next, the operations of the system thus configured will be described. In the following description, the CPU 21 of the control PC 200 serves as a main operating subject but performs the operations in cooperation with other blocks and software (applications) of the respective devices.

(General Outline of Operations of System)

Figure 5:
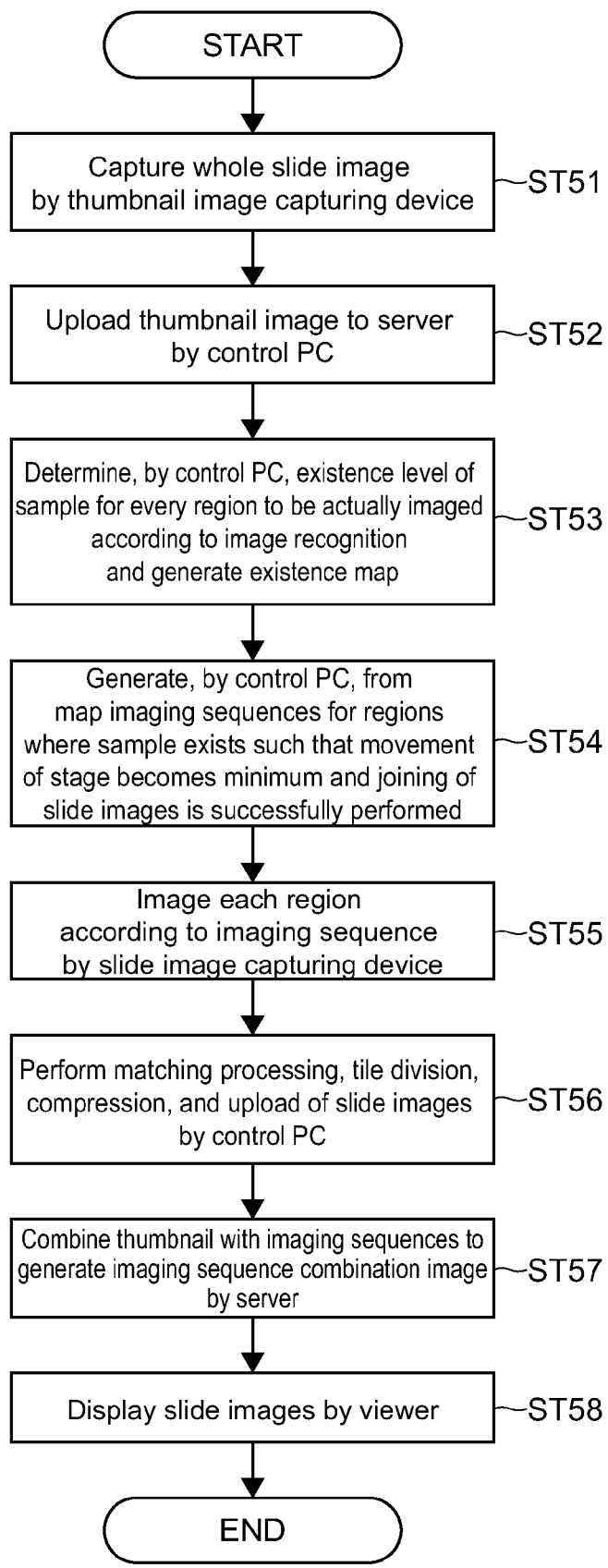
FIG. 5 is a flowchart showing the general outline of the whole operations of the virtual microscope system according to the embodiment.

FIG. 5 is a flowchart showing the general outline of the whole operations of the virtual microscope system according to the embodiment.

As shown in FIG. 5, the digital microscope 100 first captures a thumbnail image of the pathological slide with the thumbnail image capturing device 12 (step 51).

Next, the control PC 200 having received the thumbnail image uploads the thumbnail image to the server 300 (step 52).

Then, the control PC 200 calculates the likelihood (level) of the actual existence of a sample for each region to be actually imaged of the pathological slide from the thumbnail image according to image recognition processing, and generates an existence map (step 53). The existence map is uploaded to the server 300. As the image recognition processing, a known technique such as edge detection and the extraction of a high frequency component is used.

Next, based on the existence map, the control PC 200 generates imaging sequence information for the regions where the sample exists such that the movement amount of the stage of the digital microscope 100 becomes minimum and the joining (matching) of a plurality of slide images is successfully performed (step 54). The imaging sequence information is also uploaded to the server 300.

Then, according to the imaging sequence information, the digital microscope 100 images each of the regions of the pathological slide with the slide image capturing device 11 (step 55).

Next, the control PC 200 performs the matching processing, the tile division processing, and the compression processing of the slide image for each of the regions, and the upload processing of the compressed images to the server (step 56).

Then, the server 300 combines together the thumbnail image and the imaging sequence information received from the control PC 200 to generate an imaging sequence combination image (step 57). Further, the server 300 registers the slide images received from the control PC 200 therein.

Next, the viewer 400 receives the desired slide images from the server 300 as a result of a viewing request to the server 300 and displays the received slide images thereon (step 58).

(Operations of Control PC)

Figure 6:
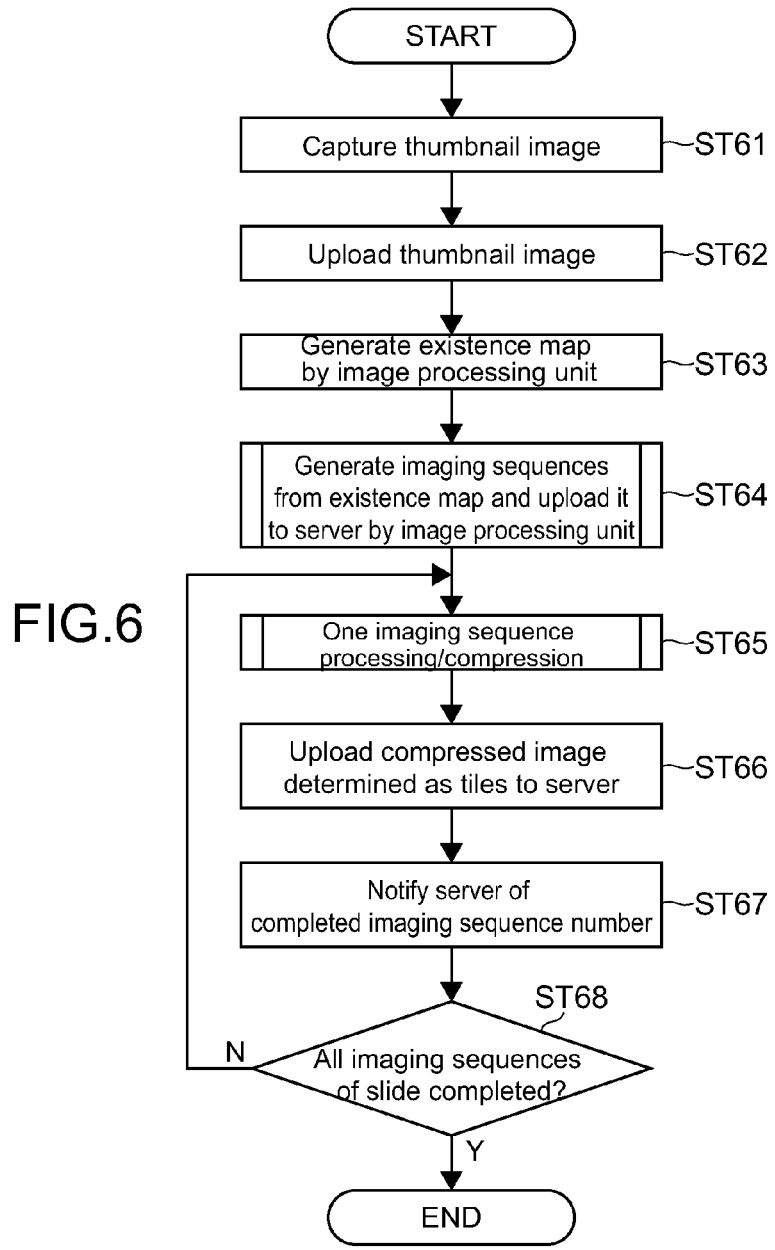
FIG. 6 is a flowchart showing the flow of the operations of the control PC in the processing of the system.

FIG. 6 is a flowchart showing the flow of the operations of the control PC 200 in the processing of the system.

As shown in FIG. 6, the CPU 21 of the control PC 200 first causes the digital microscope 100 to capture a thumbnail image and acquires the captured thumbnail image from the digital microscope 100 (step 61).

Next, the CPU 21 uploads the thumbnail image to the server 300 (step 62).

Then, the CPU 21 performs the image recognition processing on the thumbnail image with the image processing unit 23 and classifies each region of the thumbnail image according to the existence level of a sample in the region to generate an existence map (step 63).

Next, the CPU 21 generates imaging sequence information based on the existence map with the image processing unit 23 and uploads the generated imaging sequence information to the server 300 (step 64).

Then, the CPU 21 performs the processing of one imaging sequence and compresses a captured slide image in a further divided way, i.e., in units of tiles (step 65). The one imaging sequence corresponds to the imaging of almost one region. The region used for performing the matching processing that will be described below is processed in the next imaging sequence (that will be described in detail below).

Next, the CPU 21 uploads the compressed image determined as the tiles to the server 300 (step 66).

Then, the CPU 21 notifies the server 300 of a completed imaging sequence number (step 67).

Next, the CPU 21 repeatedly performs the processing of steps 65 to 67 until all the imaging sequences of the pathological slide are completed (step 68).

(Generation Processing of Imaging Sequence Information)

Figure 8:
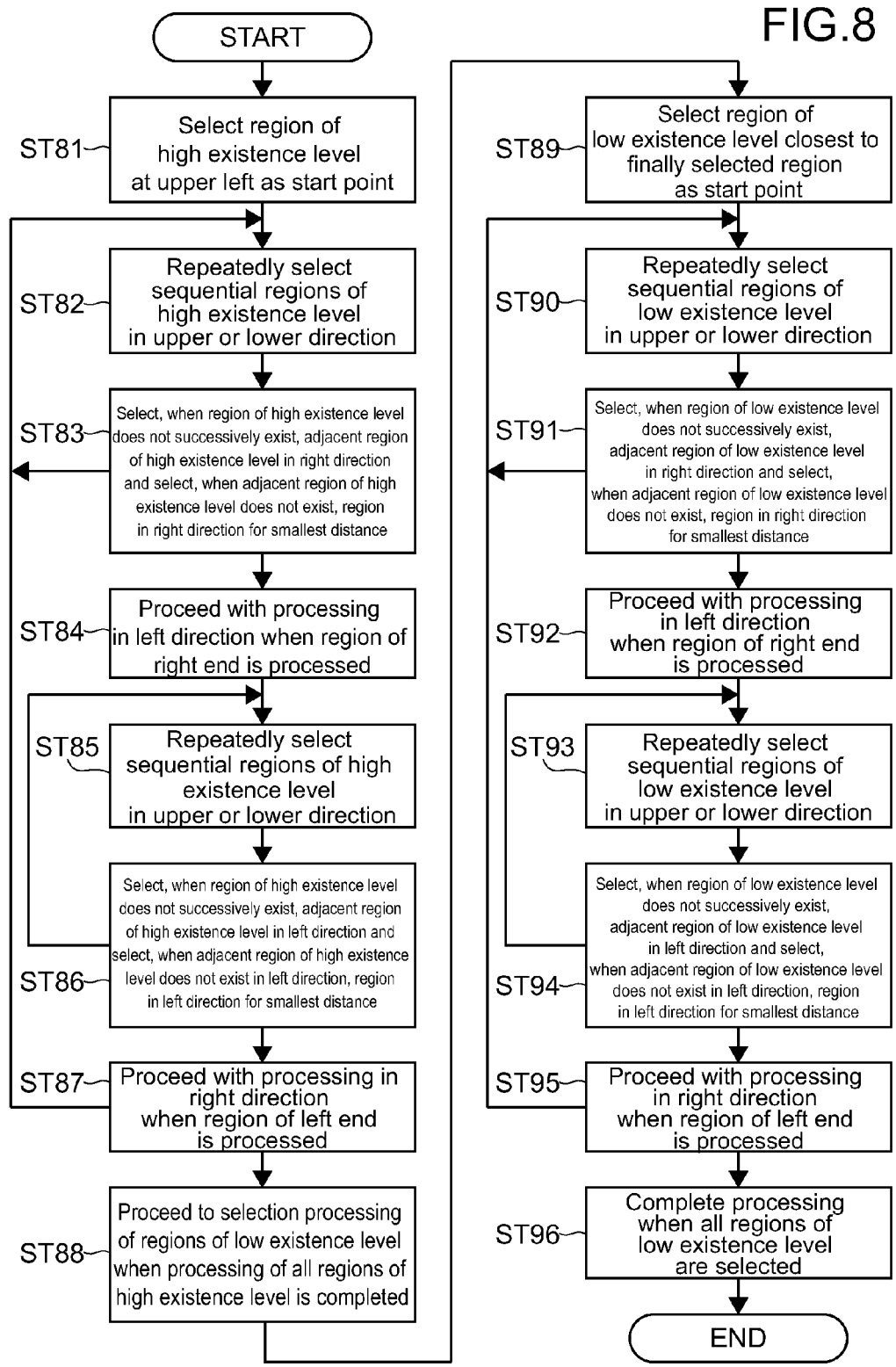
FIG. 8 is a flowchart showing the flow of the generation processing of the imaging sequence information by the control PC.

Next, the generation processing of imaging sequence information by the control PC 200 in steps 63 and 64 of FIG. 6 will be described in detail. FIGS. 7A and 7B are diagrams showing the general outline of the generation processing of imaging sequence information. FIG. 8 is a flowchart showing the flow of the generation processing of the imaging sequence information.

FIG. 7A shows the general outline of another generation processing of imaging sequences for comparison with the generation processing of imaging sequences according to the embodiment. In an existence map M shown in (A1) of FIG. 7A, a thumbnail image is divided into a plurality regions, and the likelihood of the existence of a sample is indicated by 0 or 1 for each of the regions. That is, according to this method, the likelihood of the existence of the sample in each of the regions is indicated by level 1 at which the sample exists or level 0 at which the sample does not exist.

In (A2) of FIG. 7A, imaging sequences S generated from the existence map M shown in (A1) of FIG. 7A are shown. As shown in (A2) of FIG. 7A, the imaging sequences are generated according to a method by which the regions determined to have the sample are simply joined together. That is, according to the method, the regions (of level 1) determined to have the sample are joined together in upper and lower directions with the left end of the regions as a start point and then joined together in a right direction if the regions do not exist in the upper and lower directions.

In such the imaging sequences, the sample may not actually exist in the regions determined as the regions of level 1. That is, among the regions determined as the regions of level 1, some have the sample at a relatively high probability while other have the sample at a relatively low probability. Accordingly, a positional shift may occur in subsequent matching processing particularly at the boundaries between the regions indicated by heavy lines in (A2) of FIG. 7A.

On the other hand, FIG. 7B is the diagram showing the general outline of imaging sequences according to the embodiment. As shown in (B1) of FIG. 7B, in an existence map M according to the embodiment, the existence level (likelihood) of a sample in each region is indicated by level 0, level 1, or level 2. Level 0 represents an extremely low likelihood of the existence of the sample, level 2 represents an extremely high likelihood of the existence of the sample, and level 1 represents a substantially intermediate likelihood of the existence of the sample between level 0 and level 2. That is, the sample does not almost absolutely exist in the regions of level 0. Further, the sample almost absolutely exists in the regions of level 2. Further, the sample may exist in the regions of level 1 at a relatively high probability. These levels are values obtained by edge detection and the extraction of a high frequency component.

Of course, the existence levels are not limited to three levels, and thus the existence map may be generated by the regions of four or more levels.

Then, based on the existence map of such three levels, the CPU 21 generates the imaging sequence information such that the movement amount of the stage of the digital microscope 100 from the region of the high existence level becomes minimum and a positional shift does not occur in the subsequent matching processing as much as possible. In (B2) of FIG. 7B, the imaging sequences are shown. Further, in (B3) of FIG. 7B, the order of imaging the respective regions in the imaging sequences is indicated by numbers.

More specifically, as shown in FIG. 8, the CPU 21 first selects the region of the high existence level (region of level 2) at an upper left of the thumbnail image as the start point (step 81).

Next, the CPU 21 repeatedly performs the selection processing of the sequential regions of the high existence level in the upper or lower direction of the region of the start point (step 82). In this case, the upper direction is preferentially selected among these directions.

Then, when the region of the high existence level does not successively exist in the direction, the CPU 21 selects the adjacent region of the high existence level in a right direction. In this case, when the adjacent region of the high existence level does not exist in the right direction, the CPU 21 selects the region in the right direction (also including an oblique direction) for the smallest distance of the stage (step 83).

Next, when the region of the right end among the regions of the high existence level is processed, the CPU 21 proceeds with the processing in a left direction (step 84).

That is, as in the case of step 82, the CPU 21 repeatedly performs the selection processing of the sequential regions of the high existence level in the upper or lower direction of the region of the start point (step 85).

Then, when the region of the high existence level does not successively exist, the CPU 21 selects the adjacent region of the high existence level in the left direction. In this case, when the adjacent region of the high existence level does not exist in the left direction, the CPU 21 selects the region in the left direction (including an oblique direction) for the smallest distance of the stage (step 86).

Next, when the region of the left end among the regions of the high existence level is processed, the CPU 21 proceeds with the processing in the right direction again (step 87).

When the processing of all the regions of the high existence level (regions of level 2) is completed, the CPU 21 proceeds to the selection processing of the regions of the low existence level (regions of level 1) (step 88).

That is, the CPU 21 selects, as a start point, the region of the low existence level closest to the region finally selected in the selection processing of the regions of the high existence level (step 89).

After that, the CPU 21 performs the same processing as that in steps 82 to 87, which is performed for the regions of the high existence level, on the regions of the low existence level (steps 90 to 95).

Then, when all the regions of the low existence level are selected, the CPU 21 completes the generation processing of the imaging sequence information (step 96). The generated imaging sequence information is stored in the existence map/imaging sequence preservation unit 25.

As described above, the imaging sequence information is generated such that the regions of the high existence level are imaged prior to the regions of the low existence level and that the plurality of (adjacent) regions successively arranged in the same direction are preferentially imaged. Thus, the imaging processing is quickly performed, and the subsequent matching processing is performed with increased precision.

(Update Processing of Existence Map)

Figure 9A:
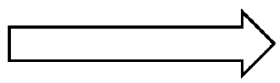
FIGS. 9A and 9B are diagrams showing the general outline of the update processing of an existence map by the control PC.
Figure 9B:
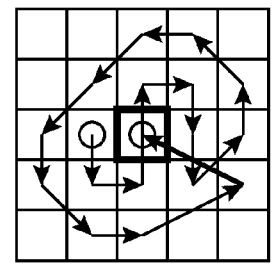

Here, the update processing of the generated existence map will be described. FIGS. 9A and 9B are diagrams showing the general outline of the update processing of the existence map.

FIG. 9A shows an example of the generated existence map on the left side thereof. As shown in the example, there is a case that a region of a low existence level (region of level 1) is surrounded by regions of a high existence level (regions of level 2) in the existence map (i.e., the region surrounded by a circle).

According to the above method of generating imaging sequences, the imaging of such a region may not be performed or may be put on a back burner as shown in imaging sequences on the right side of FIG. 9A although there is a high likelihood of a sample existing in the region involved (i.e., the region surrounded by a thick frame).

As a result, there is a concern that an imaging speed and the precision of subsequent matching processing are likely to be reduced.

According to the embodiment, as shown in FIG. 9B, the region of the low existence level surrounded by the regions of the high existence level is handled as the region of the high existence level prior to the generation processing of imaging sequence information. That is, the CPU 21 reclassifies the surrounded region (region classified as level 1) as level 2 in the existence map to update the existence map.

In this manner, the CPU 21 updates the existence map and generates the imaging sequence information based on the updated existence map according to the above method, thereby making it possible to increase an imaging speed and the precision of the subsequent matching processing.

(One Imaging Sequence Processing/Compression Processing)

Figure 10:
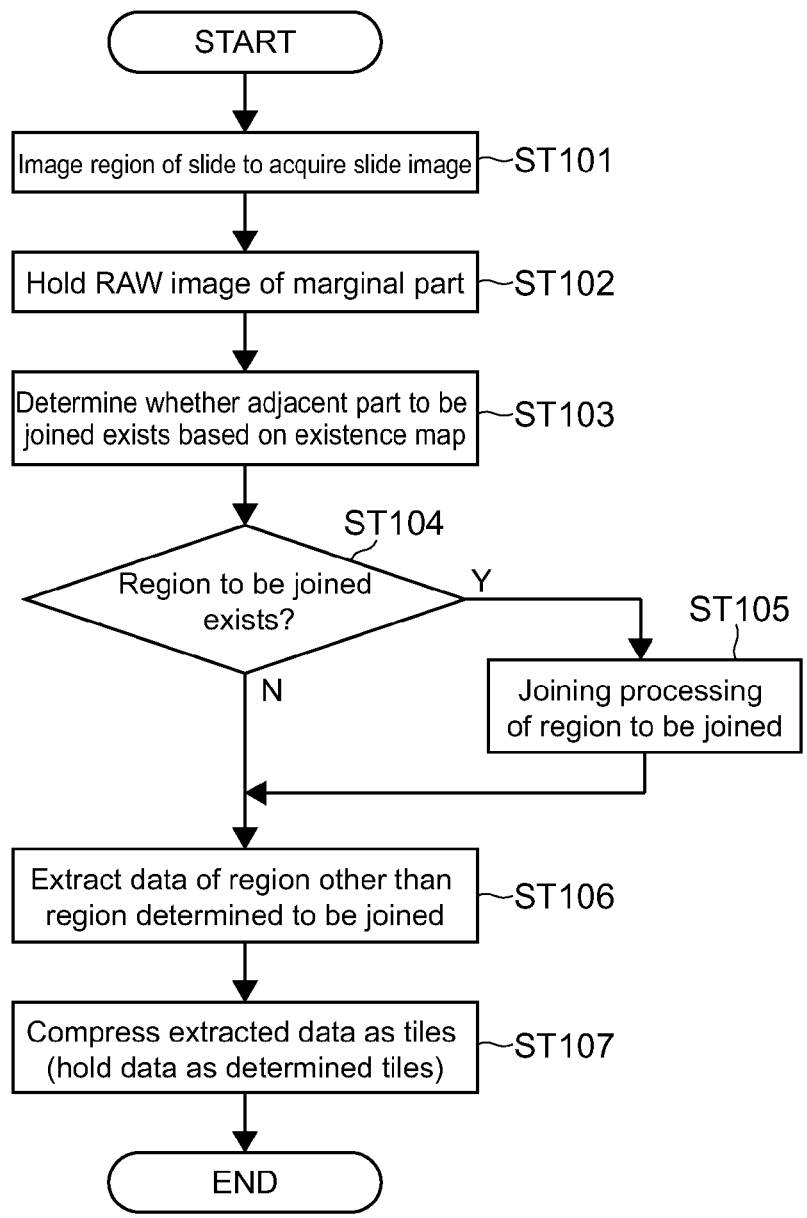
FIG. 10 is a flowchart showing the flow of one imaging sequence processing and compression processing by the control PC.

Next, the one imaging sequence processing and compression processing in step 65 of FIG. 6 will be described in detail. In the processing, the matching processing (joining processing) by the matching engine is mainly performed. FIG. 10 is a flowchart showing the flow of the one imaging sequence processing and compression processing.

As shown in FIG. 10, the CPU 21 first images a region of the pathological slide according to imaging sequence information to acquire a slide image (step 101).

Next, the CPU 21 holds in the memory the RAW image of a marginal part, which is necessary for joining to the slide image of an adjacent region, of the slide image of the region (step 102).

Then, based on an existence map, the CPU 21 determines whether the adjacent part to be joined to the RAW image exists (step 103).

If the region to be joined exists (Yes in step 104), the CPU 21 performs the joining processing of the RAW image and the adjacent part of the slide image of the adjacent region (step 105).

On the other hand, if the region to be joined does not exist (No in step 104) and when the joining processing is completed, the CPU 21 extracts the data of a region other than the region determined to be joined from the slide image (step 106).

Next, the CPU 21 compresses the extracted data in, for example, a JPEG format as tile images and holds the data as determined tile images (step 107).

Figure 11:
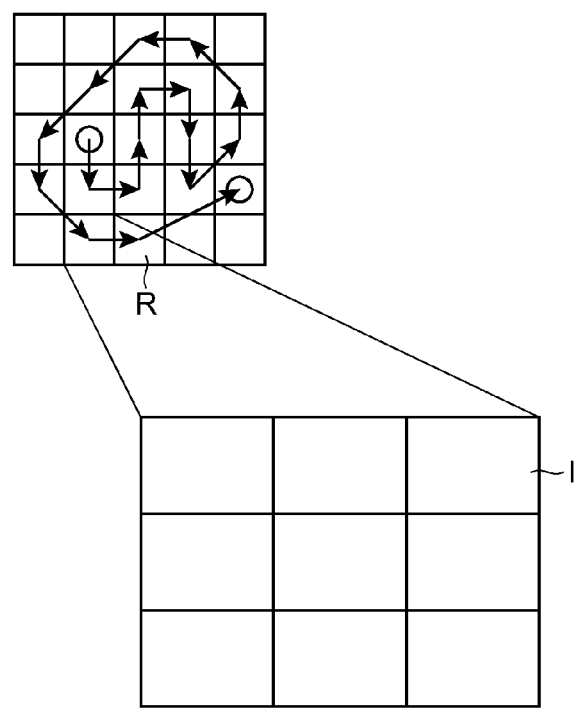
FIG. 11 is a diagram for explaining the relationship between the imaging sequence information and the size of tiles.

Here, the relationship between the imaging regions in the above imaging sequences and the size of tile images will be described. FIG. 11 shows the relationship.

As shown in FIG. 11, the tile image I compressed in each imaging sequence is smaller in size than the slide image of the region R imaged in each imaging sequence. For example, the tile image I is an image obtained by equally dividing the slide image of the imaged region into n pieces (where n is an integer). The region R is composed of, for example, nine tiles, but the number of the tiles of the region R is not limited to nine. More specifically, the one tile image has a size of, for example, 256×256 pixels, but the size of the tile image is not limited to it.

FIGS. 12A, 12B, and 12C to FIG. 15 are diagrams showing an example of the one imaging sequence processing and compression processing.

It is assumed as an example that imaging sequence information as shown in FIG. 12B is generated from an existence map shown in FIG. 12A. FIG. 12C is a diagram where imaging regions in the imaging sequences shown in FIG. 12B are divided into tiles. In this example, the three imaging regions, i.e., the upper left region, the upper right region, and the lower right region are imaged in the respective imaging sequences. Further, nine tiles are generated from each of the regions.

As shown in FIG. 13, in the first imaging sequence, the CPU 21 extracts based on the existence map the data of a part (shaded part in FIG. 13) other than a part determined to be used for joining to the imaging region on the right side, and encodes the extracted data as tile data.

Next, the CPU 21 uploads the encoded tile data to the server 300 and notifies the server 300 of the completion of the first imaging sequence.

Figure 14:
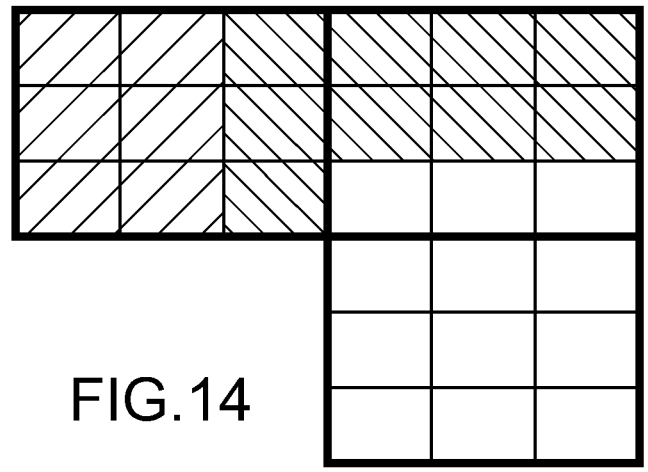
FIG. 14 is a diagram showing the example of the one imaging sequence processing and compression processing.

Then, as shown in FIG. 14, in the second imaging sequence, the CPU 21 joins together the upper left imaging region and the upper right imaging region. In addition, based on the existence map, the CPU 21 extracts the data of a part (shaded part in FIG. 14 different from the shaded part in FIG. 13) other than a part determined to be used for joining to the imaging region on the lower right side, and encodes the extracted data as tile data.

Next, the CPU 21 uploads the encoded tile data to the server 300 and notifies the server 300 of the completion of the second imaging sequence.

Figure 15:
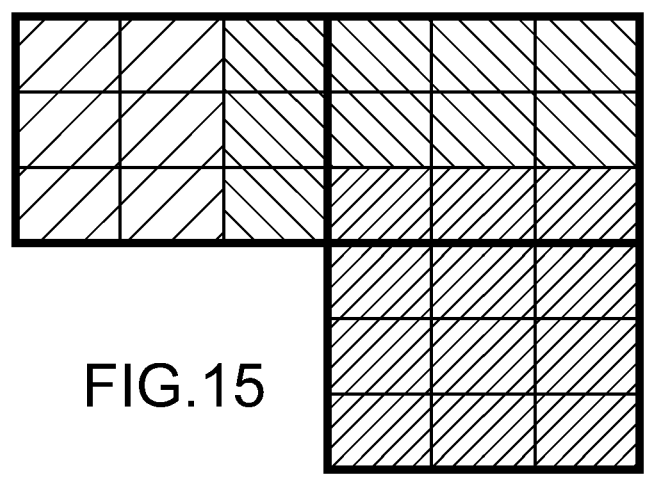
FIG. 15 is a diagram showing the example of the one imaging sequence processing and compression processing.

Then, as shown in FIG. 15, in the third imaging sequence, the CPU 21 joins together the upper right imaging region and the lower right imaging region, extracts the data of a joined part and the data of a part not used for joining (shaded part different from the shaded parts in FIGS. 13 and 14), and encodes the extracted data as tile data.

Next, the CPU 21 uploads the encoded tile data to the server 300 and notifies the server 300 of the completion of the third imaging sequence.

With such the processing, the tiles are encoded and the tile data is uploaded to the server 300 every time the imaging sequence is completed. Therefore, the server 300 registers the tile data therein every time the tile data is uploaded and allows the viewer 400 to view the tile data appropriately.

(Change Processing of Imaging Sequences)

Next, the change processing of generated imaging sequences (the update processing of imaging sequence information) will be described.

Figure 16A:
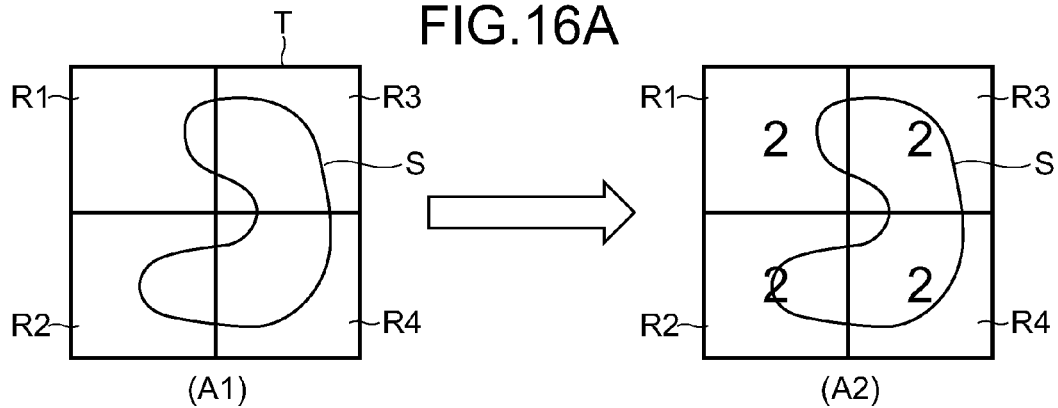
FIGS. 16A and 16B are diagrams for explaining a problem in imaging sequences.
Figure 16B:
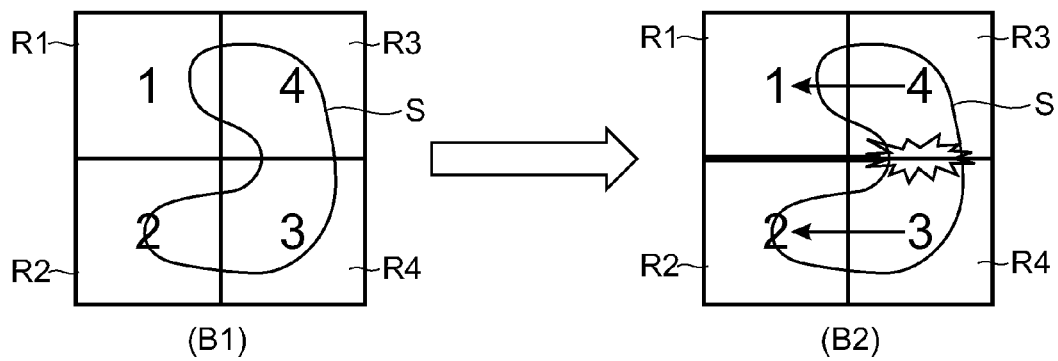

FIGS. 16A and 16B are diagrams for explaining a problem in the imaging sequences.

For example, it is assumed that a thumbnail image T corresponding to four regions shown in (A1) of FIG. 16A is captured. The thumbnail image T corresponds to the four imaging regions R1 to R4. All the regions R1 to R4 include part of a reverse C-shaped sample. Accordingly, when an existence map is generated from the thumbnail image T, all the regions have a high existence level (level 2) as shown in (A2) of FIG. 16A.

Then, imaging sequences as shown in (B1) of FIG. 16B are generated from the existence map.

However, because the sample does not exist at the boundary part (adjacent part) between the region to be imaged in the first place and the region to be imaged in the second place, the joining position of a part indicated by a thick line in (B2) of FIG. 16B becomes inconstant.

In addition, when the region to be imaged in the first place and the region to be imaged in the fourth place are joined together and when the region to be imaged in the third place and the region to be imaged in the second place are joined together, a positional shift occurs in the adjacent part between the region to be imaged in the third place and the region to be imaged in the fourth place.

According to the embodiment, when it is determined that a sample does not exist in a joining part (part for performing matching processing), the CPU 21 changes imaging sequences to prevent the above problem.

Figure 17:
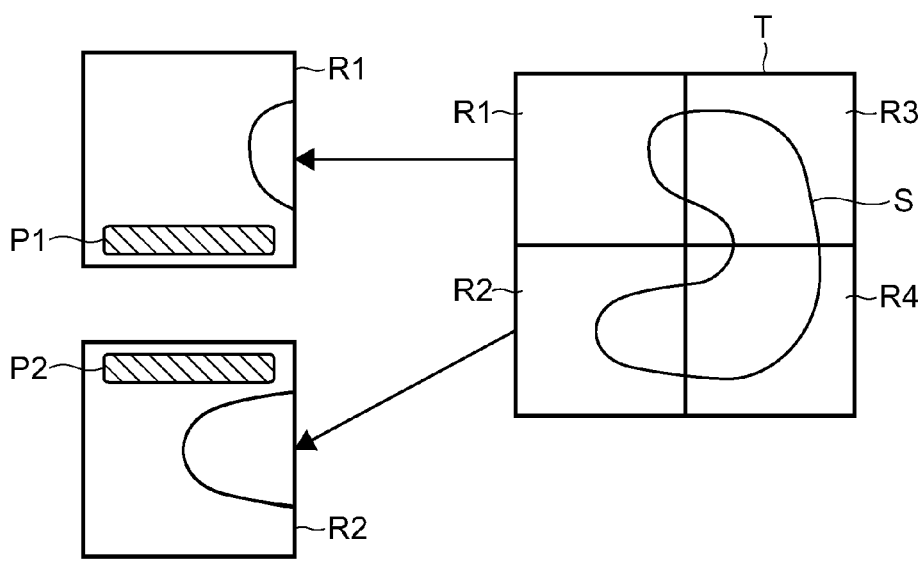
FIG. 17 is a diagram for explaining the change processing of imaging sequences.

FIG. 17 is a diagram for explaining the change processing of imaging sequences.

As shown in FIG. 17, the CPU 21 first determines whether a sample exists in parts used for performing the matching processing. If the sample does not exist in the parts, the imaging sequences are changed according to the following methods. For example, as for the matching processing of regions R1 and R2, a sample does not exist in parts P1 and P2 used for performing the matching processing of these regions. Therefore, the change processing of the imaging sequences is performed.

Figure 18A:
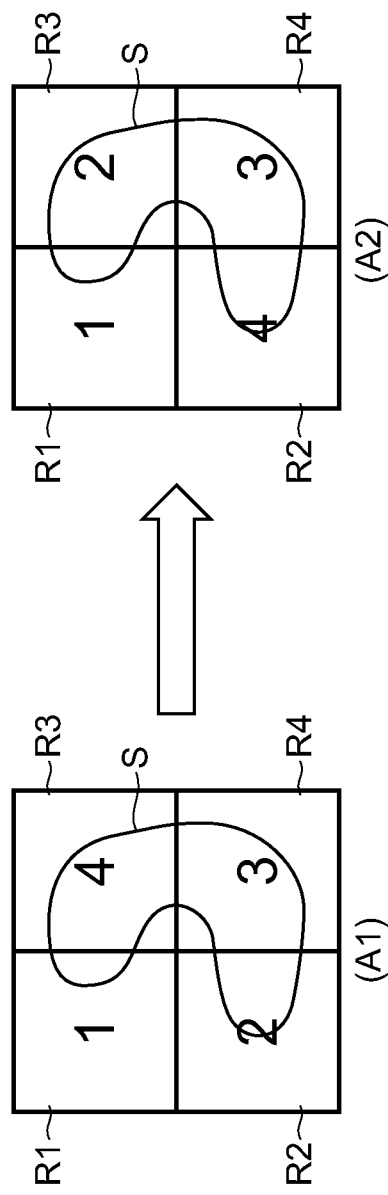
FIGS. 18A and 18B are diagrams showing a specific example of the change processing of imaging sequences.
Figure 18B:
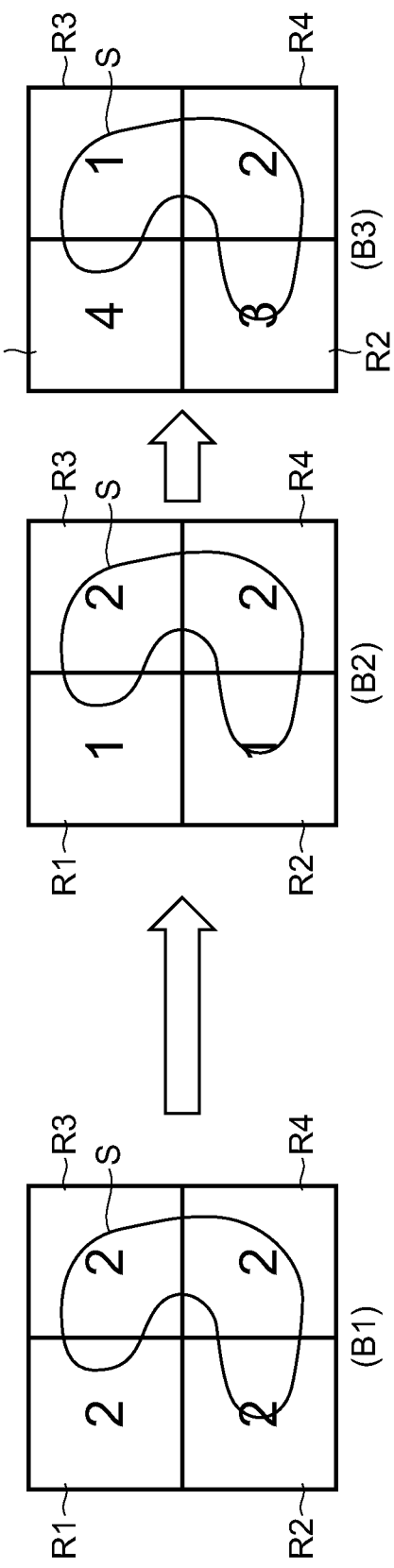

FIGS. 18A and 18B are diagrams showing the two methods for performing the change processing of imaging sequences.

According to the method shown in FIG. 18A, the imaging sequences as shown in (A1) are changed such that the matching processing is performed on the regions where the sample always exists as in imaging sequences shown in (A2). That is, the imaging sequences in the order of the region R1, the region R2, the region R3, and the region R4 in (A1) of FIG. 18A are changed to the imaging sequences in the order of the region R1, the region R3, the region R4, and the region R2 shown in (A2) of FIG. 18A in accordance with the spreading direction of the reverse C-shaped sample S.

According to the method shown in FIG. 18B, the existence levels of the regions in the existence map are changed. As a result, the imaging sequences are changed. That is, although all the regions are classified as level 2 in the existence map shown in (B1) of FIG. 18B, the levels of the regions R1 and R2 are reduced to level 1 such that the imaging of the regions R1 and R2 is put on a back burner (as shown in (B2) of FIG. 18B).

As a result, as shown in (B3) of FIG. 18B, the imaging sequences in the order of the region R3, the region R4, the region R2, and the region R1 are generated based on the changed existence map according to the above method.

FIG. 19 is a flowchart showing the flow of the change processing of imaging sequences according to the method shown in 18A.

As shown in FIG. 19, as described above, the CPU 21 first acquires a thumbnail image (step 191) and generates an existence map from the thumbnail image (step 192).

Next, as described above, the CPU 21 generates imaging sequence information from the existence map (step 193).

Then, the CPU 21 acquires, from the thumbnail image, the data of parts (i.e., parts for performing matching processing) corresponding to the margins of the shots of imaging regions adjacent to one imaging region (step 194). That is, the CPU 21 acquires the data of the respective marginal parts in the vertical and horizontal directions of the one imaging region.

Next, using the data of the marginal parts, the CPU 21 performs the matching processing on all the regions adjacent to the target region (step 195).

Then, the CPU 21 determines whether the matching processing of the regions is successfully performed, and generates the result as a map (step 196).

The CPU 21 repeatedly performs the processing of steps 194 to 196 by the number of imaging shots (imaging regions).

When the map covering all the imaging regions is generated, the CPU 21 restructures (updates) the imaging sequences to reliably perform the matching processing of the adjacent parts between all the imaging regions based on the map and the original imaging sequences (step 197). The imaging sequences are stored in the existence map/imaging sequence preservation unit 25.

Figure 20:
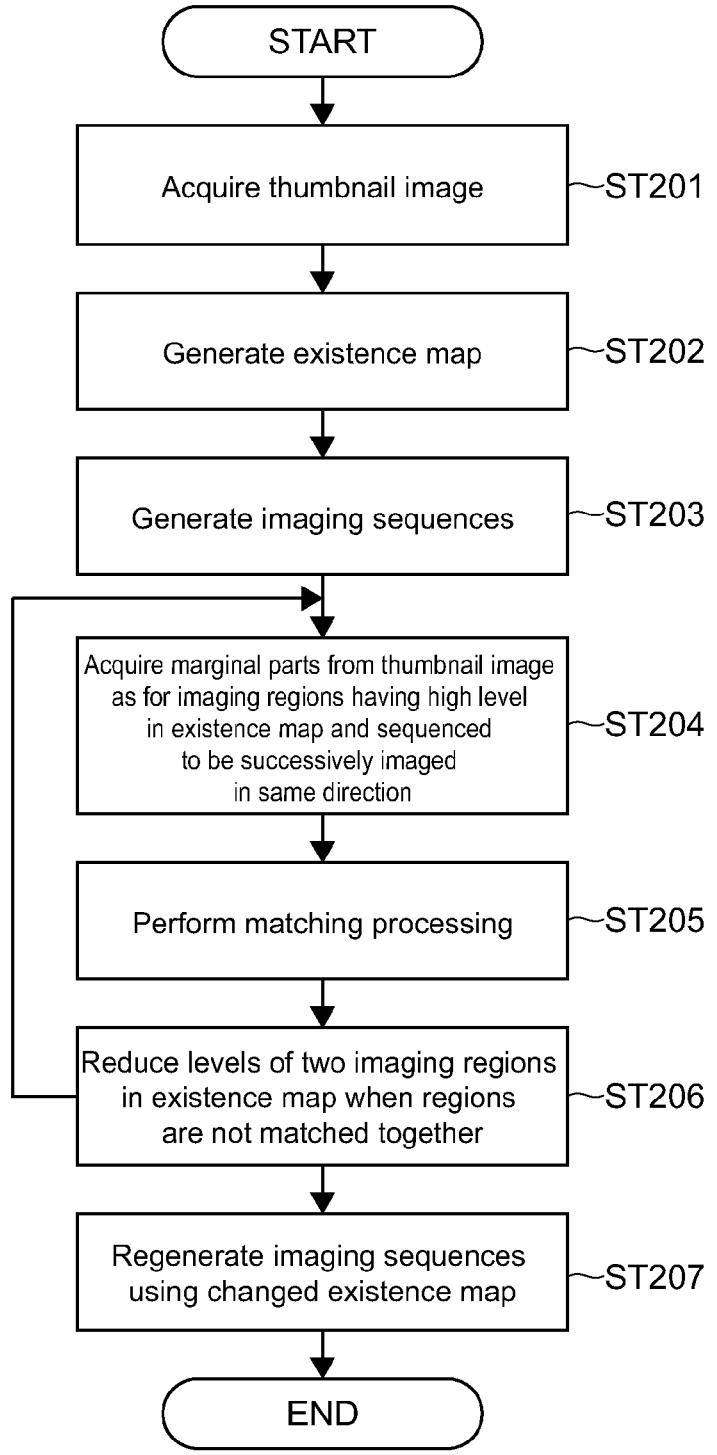
FIG. 20 is a flowchart showing the flow of the change processing of imaging sequences according to the method shown in FIG. 18B.

FIG. 20 is a flowchart showing the flow of the change processing of imaging sequences according to the method shown in FIG. 18B.

As shown in FIG. 20, the CPU 21 first generates imaging sequences based on an existence map generated from a thumbnail image as in the case of the change processing shown in FIG. 19 (steps 201 to 203).

Next, the CPU 21 acquires the data of marginal parts used for performing the matching processing from the thumbnail image as for imaging regions having a high level (level 2) in the existence map and sequenced to be successively imaged in the same direction (step 204).

Then, the CPU 21 performs the matching processing on the sequential imaging regions using the acquired data (step 205).

Next, when the matching processing of the regions is not successfully performed, the CPU 21 reduces the levels of the two imaging regions to be matched together in the existence map (the levels of the regions are reduced to level 1) (step 206).

The CPU 21 repeatedly performs the processing of steps 204 to 206 by the number of imaging shots (imaging regions).

Then, the CPU 21 regenerates imaging sequence information using the changed existence map (step 207). The regenerated imaging sequences are stored in the existence map/imaging sequence preservation unit 25.

With such the change processing of the imaging sequences, the precision of the subsequent matching processing is increased.

Further, as described above, the matching processing is performed by the matching engine. However, instead of changing the imaging sequences themselves, the CPU 21 may notify the matching engine of the fact that no parts capable of being matched together exist between two regions to be matched together.

For example, when the CPU 21 notifies the matching engine of the fact that no parts capable of being matched together exist between the regions R1 and R2, the matching engine buffers the data of the regions R1 and R2 and performs the matching processing on the regions R1 and R2 after performing the matching processing on the regions R3 and R4. With such the processing, the same effect as that of the change processing of the imaging sequences described above is obtained.

(Securement/Release of Memory for Matching Processing)

Next, the securement/release processing of a memory for the matching processing will be described.

Figure 21:
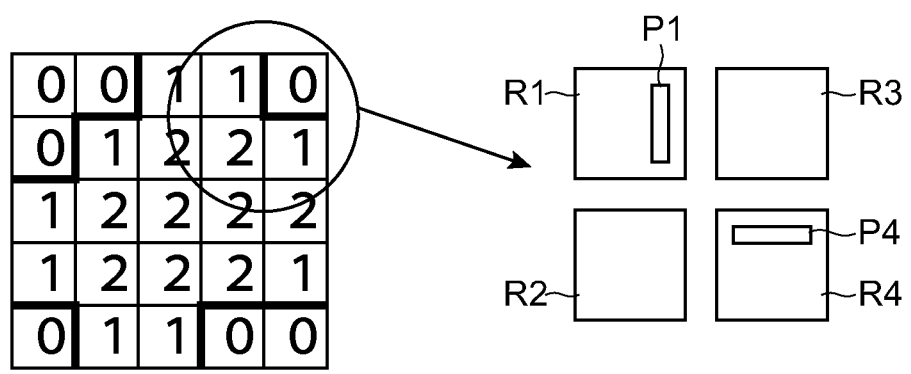
FIG. 21 is a diagram for explaining the securement of a memory for matching processing.

FIG. 21 is a diagram for explaining the securement of a memory for the matching processing.

For example, when an existence map shown in the left of FIG. 21 is used, regions inside thick lines are imaged and subjected to the matching processing. For example, among four enlarged regions at the upper right corner, the region R3 is classified as level 0. Therefore, the region R3 is not imaged, and the other regions R1, R2, and R4 are matched together.

However, when the matching engine does not refer to the existence map, it is not aware of the fact that the region R3 is not to be imaged. As a result, due to the matching processing of the region R3 and the regions R1 and R4, the matching engine uselessly secures the memory for the data of parts indicated by P1 and P4 in FIG. 21. In addition, because such a memory is secured until the matching processing of all the regions is completed, it takes time to perform post-processing at the completion of the matching processing.

In view of this, according to the embodiment, the CPU 21 (imaging sequence control unit 24) provides the matching engine with the data of the regions not to be imaged. Thus, because the matching engine can be aware of the regions not to be imaged, it does not have to secure the memory for the matching processing of the regions not to be imaged.

Figure 22:
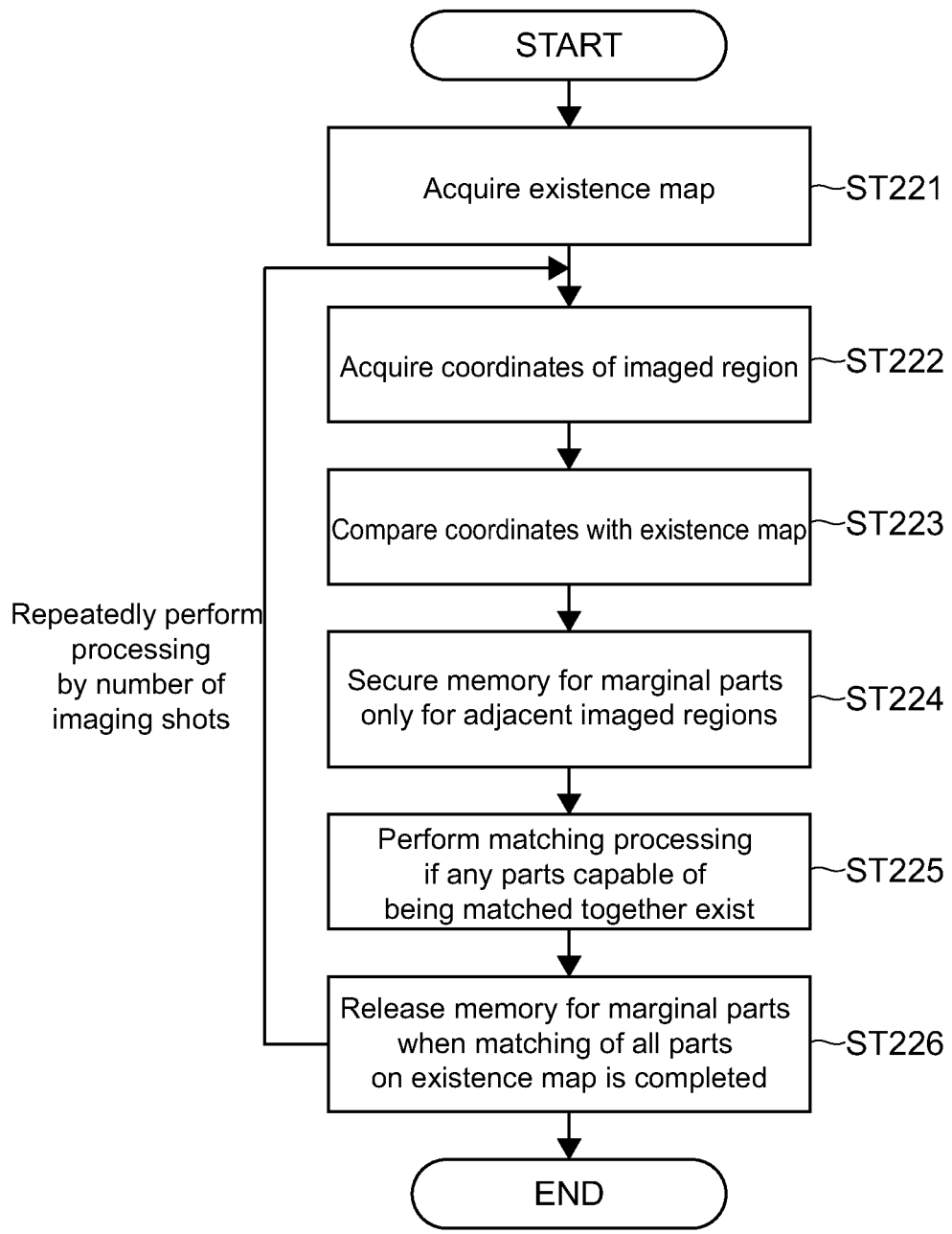
FIG. 22 is a flowchart showing the flow of the securement and release processing of the memory in the matching processing.

FIG. 22 is a flowchart showing the flow of the securement and release processing of the memory in the matching processing.

As shown in FIG. 22, as described above, the matching engine first acquires an existence map prior to the matching processing (step 221).

Next, the matching engine acquires coordinate information on the existence map of a region corresponding to one imaging shot imaged according to imaging sequence information (step 222).

Then, the matching engine compares the acquired coordinates with the existence map (step 223).

Next, based on the existence map, the matching engine secures the memory for marginal parts for performing the matching processing only for adjacently imaged regions (step 224).

Then, the matching engine performs, if any parts capable of being matched together exist, the matching processing on the parts according to progress on the imaging sequences (step 225).

Next, when the matching engine completes all the matching processing related to the one imaging shot on the existence map, it releases the memory for the marginal parts (step 226).

The matching engine repeatedly performs the above processing by the number of all the imaging shots included in the imaging sequences.

With the above processing, the memory for the marginal parts for performing the matching processing is secured only for the parts to be actually subjected to the matching processing and appropriately released every time the matching processing corresponding to one imaging shot is completed. Accordingly, the useless securement of the memory is prevented, and post-processing at the completion of the matching processing becomes unnecessary.

(Operations of Server)

Next, the flow of the processing in the system will be described focusing on the operations of the server 300.

Figure 23:
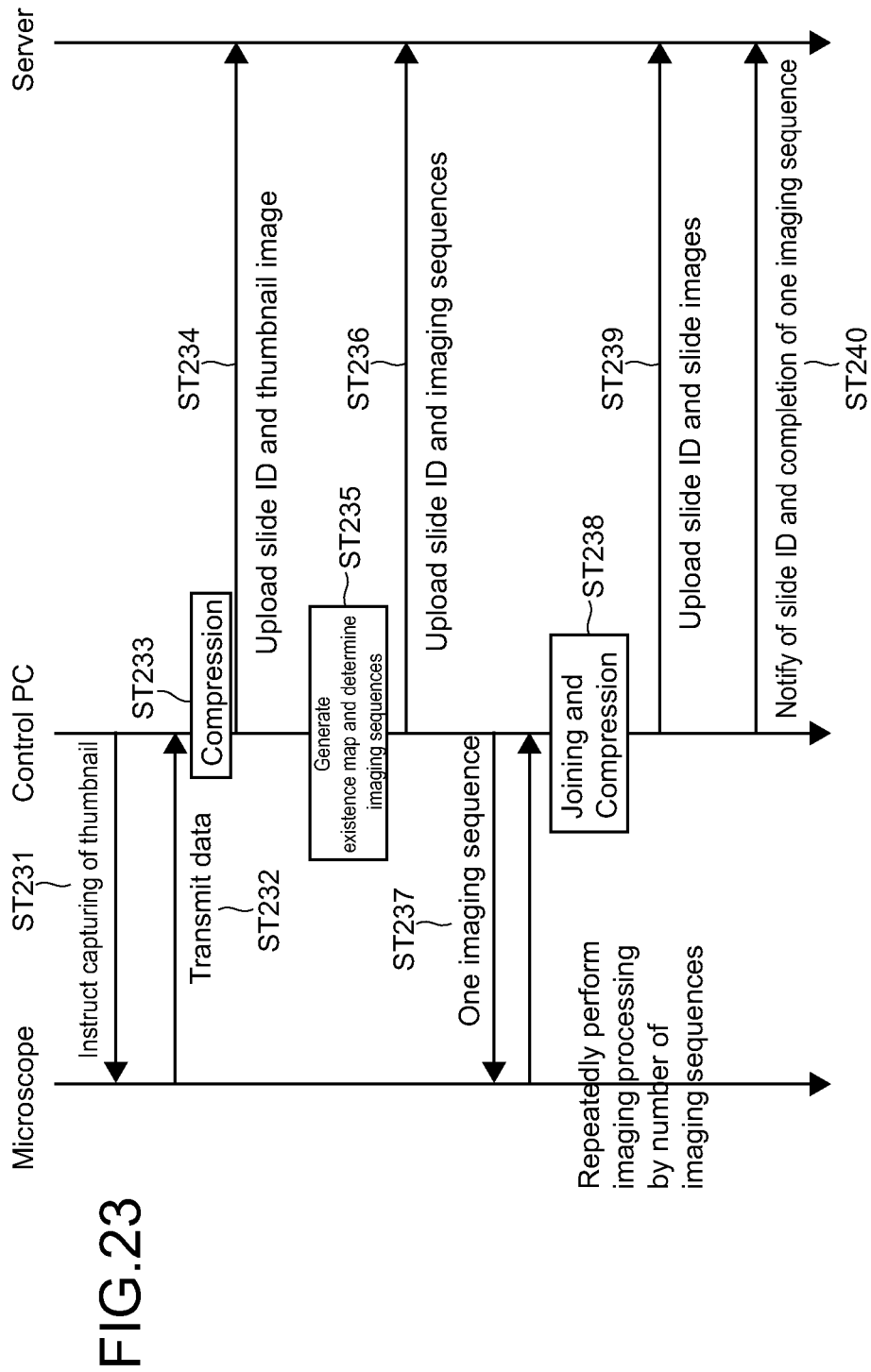
FIG. 23 is a sequence diagram showing processing by the digital microscope, the control PC, and the server and the flow of the data between them in the system.

FIG. 23 is a sequence diagram showing processing by the digital microscope 100, the control PC 200, and the server 300 and the flow of the data between them in the system.

As shown in FIG. 23, first, the control PC 200 instructs the digital microscope 100 to capture a thumbnail image (step 231).

Next, in response to the instruction, the digital microscope 100 captures the thumbnail image and transmits the captured thumbnail image to the control PC 200 (step 232).

Then, the control PC 200 compresses the thumbnail image (step 233) and uploads the compressed thumbnail image to the server 300 together with the slide ID of the pathological slide to be imaged (step 234).

Next, as described above, the control PC 200 generates an existence map from the thumbnail image and then generates imaging sequence information from the existence map (step 235).

Then, the control PC 200 uploads the generated imaging sequence information to the server 300 together with the slide ID (step 236).

Next, the control PC 200 instructs the digital microscope 100 to capture a slide image corresponding to one imaging sequence based on the imaging sequence information and then acquires the captured slide image (step 237).

Then, the control PC 200 performs the matching (joining) processing and the tile compression processing (step 238) described above and then uploads the compressed slide image (tile images) to the server 300 together with the slide ID (step 239).

Further, the control PC 200 notifies the server 300 of the completion of the imaging sequence corresponding to one imaging shot together with the slide ID (step 240).

The digital microscope 100 and the control PC 200 repeatedly perform the imaging processing, the upload processing of the slide image, and the notification of the completion of the imaging sequence by the number of imaging sequences.

Figure 24:
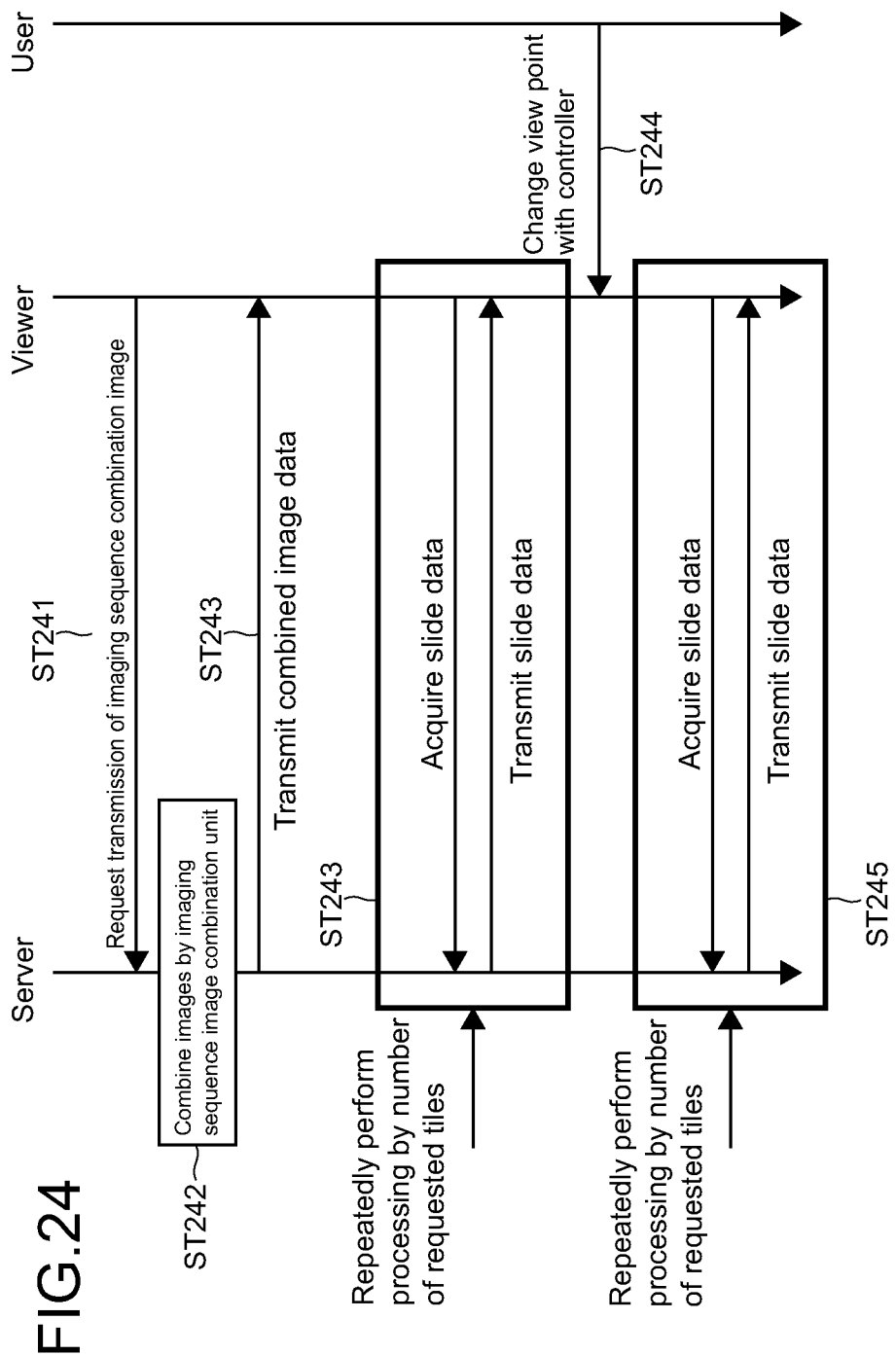
FIG. 24 is a sequence diagram showing processing by the server, a viewer, and a user and the flow of the data between them in the system.

FIG. 24 is a sequence diagram showing processing by the server 300, the viewer 400, and a user and the flow of data between them in the system.

As shown in FIG. 24, first, the viewer 400 requests the server 300 to transmit an imaging sequence combination image (step 241).

Next, as described above, the server 300 generates the imaging sequence combination image, where a thumbnail image and imaging sequence information are combined together, with the imaging sequence image combination unit 36 (step 242).

Then, the server 300 transmits the generated imaging sequence combination image to the viewer 400 (step 243). Accordingly, the user of the viewer 400 is allowed to recognize which regions of the pathological slide have been imaged and request the server 300 to transmit slide data (tile data).

Next, in response to the request from the viewer 400, the server 300 transmits the registered slide data to the viewer 400 (steps 243 and 245). The viewer 400 displays the received slide data on a display unit.

In this case, the user of the viewer 400 is allowed to change a view point (display position) in the whole slide using the imaging sequence combination image with a controller such as a mouse, and requests the server 300 to transmit slide data corresponding to the changed view point.

FIG. 25 is a flowchart showing the flow of the generation processing of an imaging sequence combination image by the server 300.

As shown in FIG. 25, the CPU 31 of the server 300 receives a request for the transmission of the imaging sequence combination image from the viewer 400 with the viewer-image-viewing response unit 33 (step 251).

Next, the CPU 31 causes the viewer-image-viewing response unit 33 to make a request to the imaging sequence image combination unit 36 for generating the imaging sequence combination image (step 252).

Then, the CPU 31 causes the imaging sequence image combination unit 36 to acquire imaging sequence information stored in the imaging sequence preservation unit 34 (step 253).

Next, the CPU 31 causes the imaging sequence image combination unit 36 to generate the imaging sequence combination image and transmit the generated imaging sequence combination image to the viewer-image-viewing response unit 33 (step 254).

Then, the CPU 31 causes the viewer-image-viewing response unit 33 to transmit the imaging sequence combination image to the viewer 400 (step 255).

Figure 26A:
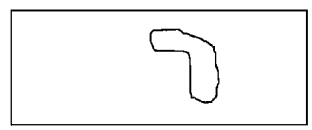
Figure 26B:
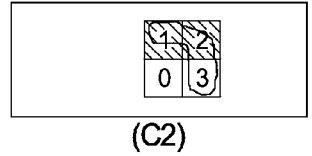

FIGS. 26A to 26C are diagrams for explaining the general outline of the generation processing of an imaging sequence combination image.

It is assumed as an example that imaging sequence information as shown in FIG. 26A is generated from a thumbnail image as shown in FIG. 26B. That is, in this example, three imaging sequences are performed in accordance with the shape of a reverse L-shaped sample.

In this case, as shown in (C1) of FIG. 26C, the CPU 31 of the server 300 adds, when imaging is completed in the first imaging sequence, a predetermined color to a region where the imaging is completed on the thumbnail image.

As shown in (C2) of FIG. 26C, the CPU 31 similarly adds, when imaging is completed in the second imaging sequence, the predetermined color to a region where the imaging is completed on the thumbnail image.

As shown in (C3) of FIG. 26C, the CPU 31 further adds, when imaging is completed in the third imaging sequence, the predetermined color to a region where the imaging is completed on the thumbnail image.

As described above, with the indication of the regions where the imaging is completed on the imaging sequence combination image using the color, the CPU 31 allows the user of the viewer 400 to be informed of progress on the imaging sequences in real time and quickly view the progress.

The method of indicating the completion of the imaging is not limited to the addition of the color to the regions, but other method such as the enclosure of the regions with thick frames may be used, for example.

(Conclusion)

As described above, according to the embodiment, the control PC 200 generates imaging sequences from an existence map based on three levels such that regions of a high existence level are preferentially imaged and the movement amount of the stage becomes minimum. Thus, the imaging processing of slide images is quickly performed, and the efficiency of subsequent matching processing is also increased.

Further, the server 300 generates an imaging sequence combination image and causes the viewer 400 to display the generated imaging sequence combination image thereon, thus allowing the user of the viewer 400 to recognize progress on imaging sequences on a thumbnail image and quickly view slide images.

(Modification)

The present disclosure is not limited to the above embodiment but may be modified in various ways without departing from the gist of the present disclosure.

The above method of generating imaging sequences described with reference to FIG. 8 or the like is not limited to the example shown in the figure. For example, the position of a start point and the movement order of the stage in the vertical and horizontal directions may be changed arbitrarily.

According to the above embodiment, an imaging sequence combination image is generated by the server 300. However, it may be generated by the viewer 400. In this case, a thumbnail image and imaging sequence information are transmitted from the server 300 to the viewer 400, and the notification of the completion of imaging sequences is also transmitted from the server 300 to the viewer 400.

According to the above embodiment, the matching (joining) processing of slide images is performed by the control PC 200. However, it may be performed by the server 300. In this case, an existence map and imaging sequence information are transmitted from the control PC 200 to the server 300.

(Other)

Note that the present disclosure may also employ the following configurations.

(1) An information processing apparatus, including:

a memory capable of storing a first image where a whole sample mounted on a stage is imaged by an imaging apparatus at a first resolution; and a control unit capable of dividing the first image into a plurality of regions, calculating a likelihood of an existence of the sample in the plurality of regions thus divided for each of the plurality of regions, generating an existence map based on the calculated likelihood, the existence map having the plurality of regions classified into first regions where the sample exists at a first likelihood, second regions where the sample exists at a second likelihood lower than the first likelihood, and third regions where the sample does not exist, and generating imaging sequence information based on the generated existence map, the imaging sequence information indicating imaging sequences such that the first regions are imaged prior to the second regions and a total movement distance of the stage for imaging the first regions and the second regions becomes minimum when a plurality of second images of the first regions and the second regions are captured by the imaging apparatus at a second resolution higher than the first resolution.

(2) The information processing apparatus according to (1), in which the control unit is capable of generating the imaging sequence information such that the plurality of first regions successively arranged in the same direction are preferentially imaged.

(3) The information processing apparatus according to (1) or (2), in which the control unit is capable of updating the imaging sequence information such that two of the second images are not successively captured when the sample is determined not to exist in each of adjacent parts of the two second images sequenced to be successively captured according to the imaging sequence information.

(4) The information processing apparatus according to (3), in which the control unit is capable of updating the existence map such that the first regions serving as imaging sources of the two second images are classified as the second regions or the second regions serving as imaging sources of the two second images are classified as the third regions, and updating the imaging sequence information based on the updated existence map. (5) The information processing apparatus according to any one of (1) to (4), in which the control unit is capable of updating the existence map by reclassifying one of the second regions and the third regions surrounded by the first regions as the first regions in the generated existence map, and generating the imaging sequence information based on the updated existence map.

(6) The information processing apparatus according to any one of (1) to (5), further including a communication unit capable of communicating with a server on a network, wherein the control unit is capable of controlling the communication unit such that the imaging sequence information and information on one of the imaged first regions and second regions are transmitted to the server.

(7) The information processing apparatus according to (6), in which the control unit is capable of controlling the memory such that the plurality of captured second images are stored to be matched together, controlling the communication unit such that a region of the stored second image not used for performing matching processing with the adjacent second image sequenced to be captured in a second place is encoded based on the existence map and the imaging sequence information, and, data of the encoded region is transmitted to the server, and controlling the communication unit such that, upon completion of the matching processing, a region of the second image used for performing the matching processing is encoded together with a region of the adjacent second image not used for performing matching processing with the adjacent second image sequenced to be captured in a third place, and data of the region encoded together with the region not used for performing the matching processing is transmitted to the server.

(8) The information processing apparatus according to (7), in which the control unit is capable of securing, prior to the matching processing, the memory only for the region used for performing the matching processing among the regions of the plurality of second images based on the existence map and the imaging sequence information.

(9) The information processing apparatus according to (7) or (8), in which the control unit is capable of controlling the communication unit such that notification information notifying completion of the imaging is transmitted to the server every time the region is encoded.

The present application claims priority to Japanese Priority Patent Application JP 2011-205864 filed in the Japan Patent Office on Sep. 21, 2011, the entire content of which is hereby incorporated by reference.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An information processing method, comprising:

storing a first image where a whole sample mounted on a stage is imaged by an imaging apparatus at a first resolution;

dividing the first image into a plurality of regions;

calculating a likelihood of an existence of the sample in the plurality of regions thus divided for each of the plurality of regions;

generating an existence map based on the calculated likelihood, the existence map having the plurality of regions classified into first regions where the sample exists at a first likelihood, second regions where the sample exists at a second likelihood lower than the first likelihood, and third regions where the sample does not exist; and generating imaging sequence information based on the generated existence map, the imaging sequence information indicating imaging sequences such that the first regions are imaged prior to the second regions and a total movement distance of the stage for imaging the first regions and the second regions becomes minimum when a plurality of second images of the first regions and the second regions are captured by the imaging apparatus at a second resolution higher than the first resolution.

2. A program storable on a non-transitory computer readable medium, the program including executable instructions that when executed by an information processing apparatus performs steps comprising:

storing a first image where a whole sample mounted on a stage is imaged by an imaging apparatus at a first resolution;

dividing the first image into a plurality of regions;

calculating a likelihood of an existence of the sample in the plurality of regions thus divided for each of the plurality of regions;

generating an existence map based on the calculated likelihood, the existence map having the plurality of regions classified into first regions where the sample exists at a first likelihood, second regions where the sample exists at a second likelihood lower than the first likelihood, and third regions where the sample does not exist; and generating imaging sequence information based on the generated existence map, the imaging sequence information indicating imaging sequences such that the first regions are imaged prior to the second regions and a total movement distance of the stage for imaging the first regions and the second regions becomes minimum when a plurality of second images of the first regions and the second regions are captured by the imaging apparatus at a second resolution higher than the first resolution.

* * * * *